US008807350B2

(12) United States Patent
Linder et al.

(10) Patent No.: US 8,807,350 B2
(45) Date of Patent: Aug. 19, 2014

(54) COMPOSITE MEMBRANES AND METHODS FOR THEIR PREPARATION

(75) Inventors: Charles Linder, Rehovot (IL);
Viatcheslav Freger, Beer-Sheva (IL);
Yoram Oren, Beer-Sheva (IL)

(73) Assignee: Ben-Gurion University of The Negev Research & Development Authority, Beer Sheva (IL)

( * ) Notice: Subject to any disclaimer, the term of this patent is extended or adjusted under 35 U.S.C. 154(b) by 1450 days.

(21) Appl. No.: 11/995,536

(22) PCT Filed: Jul. 16, 2006

(86) PCT No.: PCT/IL2006/000825
§ 371 (c)(1),
(2), (4) Date: Jul. 23, 2008

(87) PCT Pub. No.: WO2007/007343
PCT Pub. Date: Jan. 18, 2007

(65) Prior Publication Data
US 2009/0001009 A1 Jan. 1, 2009

Related U.S. Application Data

(60) Provisional application No. 60/698,957, filed on Jul. 14, 2005.

(51) Int. Cl.
*B01D 71/72* (2006.01)
*B01D 69/12* (2006.01)
*B01D 69/14* (2006.01)
*B01D 67/00* (2006.01)

(52) U.S. Cl.
CPC .......... *B01D 69/141* (2013.01); *B01D 2325/26* (2013.01); *B01D 67/0079* (2013.01); *B01D 67/0088* (2013.01); *B01D 69/125* (2013.01); *B01D 71/72* (2013.01)
USPC ............... 210/500.21; 96/12; 210/500.25; 210/500.27; 210/501; 210/502.1; 210/506; 210/653

(58) Field of Classification Search
CPC ........... B01D 67/0079; B01D 67/0088; B01D 69/125; B01D 6969/141; B01D 69/148; B01D 71/22; B01D 2325/26
USPC ............... 210/650, 652, 653, 506, 500.27, 210/500.25, 501, 502.1, 504; 96/6–14
See application file for complete search history.

(56) References Cited

U.S. PATENT DOCUMENTS

| | | | |
|---|---|---|---|
| 3,556,305 A | 1/1971 | Schorr | |
| 3,567,810 A | 3/1971 | Baker | |
| 3,615,024 A | 10/1971 | Michaels | |
| 4,029,582 A | 6/1977 | Ishii et al. | |
| 4,230,463 A | 10/1980 | Henis et al. | |
| 4,272,346 A | 6/1981 | Jakubowski et al. | |
| 4,468,291 A | 8/1984 | Naarmann et al. | |
| 4,765,915 A * | 8/1988 | Diehl | 210/767 |
| 4,933,052 A | 6/1990 | O'Brian et al. | |
| 4,986,886 A | 1/1991 | Wei et al. | |
| 5,039,421 A * | 8/1991 | Linder et al. | 210/651 |
| 5,100,523 A | 3/1992 | Helms et al. | |
| 5,108,573 A | 4/1992 | Rubinstein et al. | |
| 5,128,013 A * | 7/1992 | Helms | 428/426 |
| 5,186,813 A | 2/1993 | Helms | |
| 5,190,654 A * | 3/1993 | Bauer | 210/490 |
| 5,198,112 A | 3/1993 | Martin et al. | |
| 5,200,041 A | 4/1993 | Simonet et al. | |
| 5,422,246 A | 6/1995 | Koopal et al. | |
| 6,156,202 A | 12/2000 | Singh et al. | |
| 8,029,857 B2 * | 10/2011 | Hoek et al. | 427/245 |
| 8,591,741 B2 * | 11/2013 | Wang et al. | 210/652 |
| 2010/0062156 A1 * | 3/2010 | Kurth et al. | 427/243 |

FOREIGN PATENT DOCUMENTS

| | | |
|---|---|---|
| EP | 665275 | 8/1995 |
| GB | 2000720 | 1/1979 |
| WO | WO 85/00985 A1 * | 3/1985 |

* cited by examiner

*Primary Examiner* — David C Mellon
(74) *Attorney, Agent, or Firm* — Rodney J. Fuller; Booth Udall Fuller, PLC

(57) ABSTRACT

There is provided a composite membrane, which may include an electronically conductive asymmetric porous support and an electro-polymerized selective layer. There is also provided a composite membrane for water application(s), which may include an electronically conductive porous support and an electro-polymerized selective layer. Moreover, there is provided a composite membrane for gas application(s), which may include an electronically conductive asymmetric porous support and an electro-polymerized selective layer. There is also provided a membrane system which may include at least one composite membrane which may include an electronically conductive asymmetric porous support and an electro-polymerized selective layer. In addition there is provided a method for the preparation of a composite membrane.

20 Claims, No Drawings

COMPOSITE MEMBRANES AND METHODS FOR THEIR PREPARATION

CROSS-REFERENCE TO RELATED APPLICATIONS

The present application is a US National Phase of PCT Application No. PCT/IL2006/000825, filed on Jul. 16, 2006, which claims the benefit under 35 U.S.C. 119(e) of U.S. Provisional Application 60/698,957 filed Jul. 14, 2005, the disclosure of which is incorporated herein by reference.

FIELD OF THE DISCLOSURE

The present disclosure generally relates to the field of membranes. More specifically, the present disclosure relates to composite membranes and methods for the preparation thereof.

BACKGROUND

Various membrane processes may generally be applied for water treatment or industrial treatment applications. The cost effectiveness of these processes may vary depending on the specific application(s), site considerations, such as energy availability, capital costs, competitive processes and the combination of the membrane properties (such as flux, separation characteristics, performance stability, and fouling resistance as well as the ability to be cleaned when fouled). For water treatment and desalination applications, for example, to-date commonly used membranes are reverse osmosis (RO) and/or nanofiltration membranes (NF) membranes based on polyamide composites. These membranes may generally be considered to have high flux and rejection characteristics, even though from the stability and chemical resistance point there is still a need for improvement. Other NF and RO membranes, such as polysulfonated polyvinyl alcohol and sulfonated engineering plastics membranes, may generally be considered to have better chemical resistance but suffer from flux/selectivity characteristics worse than the polyamide composites membranes. It appears however that for many water applications flux and rejection may be considerably important. Therefore the development and manufacture of membranes having the flux/selectivity/rejection properties similar to (or better than) that of the polyamide membranes but with a chemical stability similar to (or better than) the chemical stability of sulfonated polyether sulfones is highly important and may considerably lower the cost of water treatment.

Existing membranes, such as composite membranes and more specifically, thin film composite membranes, suffer from many disadvantages. For example, coating of a support layer with a discriminating layer may result in variations of thickness of coating material. In areas where no coating is present or where the coating is below a certain thickness the membrane may be exceedingly porous and therefore may not have sufficient separation capability. Where the coating exceeds the desired thickness, the flux may be affected. In membranes where the discriminating layer is prepared separately, the discriminating layer may at least partially separate from the support layer.

Electrochemically initiated polymerization has been applied to deposit polymers upon a porous support, such as a membrane layer, to form composite membranes for gas separation. U.S. Pat. No. 5,198,112, which is herein incorporated by reference in its entirety, relates to ultra-thin composite membrane. U.S. Pat. No. 5,198,112 does not describe RO and/or NF membranes nor does it describe electrochemically initiated polymerization on an organic porous support.

There is thus a need in the art for improved and cost effective composite membranes that may be applied, for example, for liquid containing media such as water treatment applications.

GLOSSARY

The term "membrane" as referred to herein may relate to a selective barrier that allows specific entities (such as molecules and/or ions) and to pass through, while retaining the passage of others. The ability of a membrane to differentiate among entities (based on, for example, their size and/or charge and/or other characteristics) may be referred to as "selectivity".

The term "composite membrane" as referred to herein may relate to membranes that include more than one material wherein the materials may have different densities. Composite membrane may include for example "thin film composite membranes" which may generally refer to membranes constructed in the form of a film from two or more layered materials.

The term "flux" as referred to herein may relate to a volume of treated liquide (such as water, fermentation liquors, concentration of antibiotics, waste and other liquides) obtained per unit time per unit membrane surface area.

The term "permeate" as referred to herein may relate to a product, for example liquide, which has passed through a membrane. The term "permeate" may, for example, relate to a non concentrated resultant products during filtration.

The term "retentate" (may also be referred to as "concentrate") as referred to herein may relate to a fraction not passing through the membrane.

The term "rejection" as referred to herein may generally relate to a percentage of a substance (such as a salt) rejection in a membrane (such as a reverse osmosis membrane) process. The rejection may be calculated, for example, as the percentage of salt which is held back by the membrane. For example, $R = 1 - (Cp/Cb)$ where R=Rejection, Cp=Concentration in Permeate, Cb=Concentration in Retentate.

The term "micro-filtration" or "MF" as referred to herein may relate to a technique that utilizes a low-pressure cross-flow membrane process for separating colloidal and suspended particles in the range of 0.05-10 microns. MF may be used foe example for fermentation broth clarification and biomass clarification and recovery.

The term "ultrafiltration" or "UF" as referred to herein may relate to a membrane separation technique used to separate small particles and dissolved molecules in fluids. The primary basis for separation may be molecular size, although other factors, such as but not limited to, molecule shape and charge can also play a role. Molecules larger than the membrane pores will generally be retained at the surface of the membrane and concentrated during the ultrafiltration process. The retention properties of ultrafiltration membranes may be expressed as "Molecular Weight Cutoff" (MWCO). This value may refer to the approximate molecular weight (MW) of a molecule, compound and/or material (such as polymers, proteins, colloids, polysaccharides, suspended solids and/or solutes), which is about 90% or more retained by the membrane. However, a molecule's shape can have a direct effect on its retention by a membrane. For example, linear molecules like DNA may find their way through pores that will retain a globular species of the same molecular weight.

Ultrafiltration membranes may be adapted to let through small molecules (such as water, low-molecular-weight organic solutes and salts) and retain high-molecular weight molecules (such as, polymers, proteins, colloids, polysaccharides, and/or suspended solids and solutes of molecular weight greater than 1,000). UF may be performed under pressures up to about 145 psi (10 bar). Ultrafiltration (UF) may also relate a technique that utilizes membranes, such as having micropores of about 1 to 100 nanometer (nm) in diameter.

The term "nanofiltration" or "NF" as referred to herein may relate to a technique that utilizes membranes that have pores with a diameter of about one nanometer. NF membranes may be adapted to essentially let through monovalent ions and organic compounds with low molecular weight (typically less than about 300 g/mol) and retain multivalent ions (for example, calcium, magnesium, aluminum, sulfates ions and others), non-ionized organic compounds (for example solutes) with high molecular weight (typically higher than about 300 g/mol) and suspended solids. Typically, NF membranes' selectivity is characterized by separations of monovalent and divalent salts and organic solutes of molecular weights up to 1000. Thus, for example, NF membranes may be available with molecular weight cut offs of, for example, 80, 50, 20 and 0% rejection to NaCl and 95+% for 1,000 MW dextran. Such membranes may be used, for example, in water softening, fractionation of pharmaceutical fermentation liquors, whey desalting with lactose retention, skim milk concentration, fractionation of sugars, concentration of antibiotics, treatment of surface water and drinking water, municipal waste treatment for agricultural use, and in numerous other industrial uses for treatment of process and waste streams. The substantial variety of membrane separation properties that falls within the NF range may be derived form the differences in the separation mechanism may be derived from the differences in permanent charge sign and density and pore size that are available in NF membranes.

The term "reverse osmosis" or "RO" as referred to herein may relate to a technique that utilizes dense membranes that allow solvents, typically water, to pass through while retaining any salts. RO may be used, for example, to demineralize water (such as seawater or brine desalting) or for the production of ultrapure water. RO may be performed under high pressures.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantageous or improvements.

In some embodiments, there is provided a composite membrane which may include an electronically conductive asymmetric porous support and an electro-polymerized selective layer.

In other embodiments, there is provided a composite membrane for water application(s) may include an electronically conductive porous support and an electro-polymerized selective layer.

In other embodiments, there is provided a composite membrane for gas application(s), which may include an electronically conductive asymmetric porous support and an electro-polymerized selective layer.

In other embodiments, there is provided a membrane system which may include at least one composite membrane which may include an electronically conductive asymmetric porous support and an electro-polymerized selective layer.

According to further embodiments, there is provided a method for the preparation of a composite membrane, the method may include immersing a conductive asymmetric porous support as a first electrode in a solution which may include electro-polymerizable monomer(s) and applying a first voltage between the support and a second electrode in the solution whereby the electro-polymerizable monomer(s) are polymerized on a surface of the support to form a first electro-polymerized selective layer.

DETAILED DESCRIPTION

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In some embodiments, there is provided a composite membrane solution which may include an electronically conductive asymmetric porous support and an electro-polymerized selective layer.

In other embodiments, there is provided a composite membrane for water application(s), the membrane may include an electronically conductive porous support and an electro-polymerized selective layer.

Water application(s) may include reverse osmosis, nanofiltration, ultrafiltration, microfiltration, any combination thereof or any other relevant water application.

In other embodiments, there is provided a composite membrane for gas application(s), the membrane may include an electronically conductive asymmetric porous support and an electro-polymerized selective layer.

In other embodiments, there is provided a membrane system which may include at least one composite membrane the membrane may include an electronically conductive asymmetric porous support and an electro-polymerized selective layer. The membrane may be adapted for use in water application(s), gas application(s) or both. The at least one composite membrane may be configured as a flat sheet. The at least one composite membrane may be spirally configured. The at least one composite membrane may be configured as a capillary, hollow fiber, tubular membrane or any combination thereof or in any other appropriate configuration.

The composite membrane may be adapted to allow the flow of the permeate from the outer side to the inner side of the composite membrane. The composite membrane may be adapted to allow the flow of the permeate from the inner side to the outer side of the composite membrane. The membrane may be used for nanofiltration, reverse osmosis, ultrafiltration or any combination thereof.

The support may be an ultrafiltration membrane, a microfiltration membrane, a combination thereof or any other appropriate support. The support may include a first porous layer integrally formed on a second porous layer, wherein the pore size and the thickness of the first porous layer is smaller than the pore size and the thickness of the second porous layer.

The thickness of the first porous layer may be between about 0.01 microns-5 microns (for example 0.05-2, 0.1-1 microns) and the thickness of the second porous layer may be between about 10 microns-1000 microns (for example 50-500, 100-300 microns).

The support may include a polymeric membrane. The polymeric membrane may be produced by the process of phase inversion. For example, a solution of the polymer (non limiting examples for solution components may include, polysulfone or polyethersulfone or polyphenylene sulfone or polyvinylidene fluoride dissolved in NMP or DMF or DMSO alone or in combination with other co-solvents and/or additives such as non solvents or surfactants and block co-polymers as compatibilzers of the components of the final membranes, and/or additives which aid in pore formation, which help to adjust the properties of the solution prior, during and/or post phase inversion) may be cast onto a support from which it may be removed or on a support where it is not removed, example of such latter supports may be polyolefin or polyester non woven, and the supported wet film may optionally be partially evaporated and then immersed in a solution which precipitates the polymer to form an asymmetric porous membrane (such as a UF membrane). To confer upon this asymmetric porous membrane, electronically conductive properties, the polymeric solution may contain micron or submicron or nano sized conductive particles in a concentration above the percolation point needed to achieve bulk conductivity which may be in the range of 5-50%, typically in the range of 33%.) The support may thus include a non-conductive polymer matrix with conductive particles, which may be above the percolation point.

The conductive particles may be spherical particles and may have the diameters of about 0.1 to 1000 nanometers, for example, 10 to 200 nanometers.

The conductive particles may include activated carbon, charcoal, carbon black, carbon soot, nano-tubes, graphite, amorphous carbon or any combination thereof. The conductive particles may include metal(s), conductive nitride(s), conductive oxide(s), conductive carbide(s) or any combination thereof.

The metal(s) may include Fe, Ti, Zr, Pd, Pt, Au, Ag, Co, Al, Mg, Ru or any combination thereof. The conductive nitride(s) may include Titanium nitride. The conductive oxide(s) may include $ZrO_2$, $TiO_2$. The support may include an initially formed non-conductive polymer surface, which is then made conductive by deposition of a conductive layer.

The conductive layer is formed by vapor deposition, solvent deposition, electrode less method or any combination thereof. The conductive layer is formed by carbon vapor or solvent deposition, metal vapor deposition, oxide deposition or any combination thereof.

The support may include a non-conductive polymer matrix with a conductive polymer. The conductive polymer may include conductive redox polymer mixed in a compatible blend or a non-compatible blend, wherein the concentration of the conductive redox polymer is above the percolation point needed to achieve electronic conductivity. The conductive polymer may include polyacetylene, polypyrrole, poly (p-phenylene), polythiophene, polyphenylene vinylene, polyaniline, polyanisidine, polyfuran, polyazulene, polyindole or any combination thereof.

The membrane may include crosslinked polymers. The membrane may include aromatic group(s), polar group(s), hydrogen bonding group(s), crosslinks or any combination thereof.

Any of the membrane disclosed herein may include an electro-polymerized selective layer which may include an electro-polymerizable monomer units. The electro-polymerizable monomer units may be polymerized into a conductive polymer. The electro-polymerizable monomer units may include pyrrole, thiophene, aniline, carbazole, azulene, faran, derivatives thereof or any combination thereof. The electro-polymerizable monomer units may include N-methylpyrrole, thiophene, and 3-methylthiophene. The electro-polymerizable monomer units may be polymerized into a non-conductive polymer. The non-conductive polymer may include aromatic monomer units having at least on aromatic hydroxyl group or a derivative thereof. The aromatic monomer units may have at least on aromatic hydroxyl group or a derivative thereof which may include phenol, phenol derivative or both. The aromatic monomer units may have at least on aromatic hydroxyl group or a derivative thereof which may include phenol, 2-allylphenol 2,6-dimethyloxyphenylene 3-5-Dimethylphenol, 2-chlorophenol, a derivative thereof or any combination thereof. The aromatic monomer units may have at least on aromatic hydroxyl group or a derivative thereof which may include p-aminothiophenol, 3-methyl-4-chlorophenol, dichlorophen, o-phenylphenol, m-phenylphenol, p-phenylphenol, 2-benzyl-4-chlorophenol; 4-chloro-2-phenylphenol, 4-chloro-2-benzylphenol, 3,5-dichlorophenol, 2,5-dichlorophenol, 3,5-dibromophenol, 2,5-dibromophenol, 2,5-(3,5)-dichlorobromophenol, 3,4,5-trichlorophenol, tribromophenol, trtrachlorophenol, 3-methyl-4-chlorophenolor, any derivative thereof or any combination thereof. The aromatic monomer units may have at least on aromatic hydroxyl group or a derivative thereof which may include poly-phenol. The poly-phenol may include bis-phenol fluorene, bis-phenol A, bis-phenol F, bis-phenol S, resorcin, catechol, mono or dihydroxy naphthol, derivatives thereof or any combination thereof. The aromatic monomer units may have at least on aromatic hydroxyl group or a derivative thereof which may include a chlorinated hydroxydiphenylether. The chlorinated hydroxydiphenylether may include 2-hydroxy-3, 2'4'-trichlorodiphenylether.

The electro-polymerized selective layer may include a first and a second electro-polymerized selective layers, wherein the first electro-polymerized selective layer is disposed on the surface of the support and the second electro-polymerized selective layer is disposed on the surface of the first electro-polymerized selective layer.

The first electro-polymerized selective layer may include an electronically conductive film and the second electro-polymerized selective layer which may include a non-conductive film. The first and second electro-polymerized selective layers may include electronically conductive films. The first and second electro-polymerized selective layers may include non-conductive films. The electro-polymerizable monomer units which may include vinyl group(s), polycyclic aromatic group(s) or both. The electro-polymerizable monomer units may include divinylbenzene, styrene sulfonic acid, vinyl sulfonic acid, vinyl phosphonic, styrene phosphonic, acrylic acid, styrene carboxylic acid, vinyl phenol or any combination thereof.

Any of the membrane disclosed herein may be a nanofiltration membrane. The nanofiltration membrane may be adapted for use in water softening, fractionation of pharmaceutical fermentation liquors, whey desalting with lactose retention, skim milk concentration, fractionation of sugars, concentration of antibiotics, treatment of surface water waters for drinking, municipal waste treatment for agricultural use, treatment of process streams, treatment of waste streams or any combination thereof.

Any of the membrane disclosed herein may be a reverse osmosis membrane. The reverse osmosis membrane may be adapted for use in desalination and/or treatment of brackish water, seawater, surface water, municipal wastewater, well water or any combination thereof. Any of the membrane disclosed herein may be an ultrafiltration membrane.

According to further embodiments, there is provided a method for the preparation of a composite membrane (for example, the membranes disclosed herein), the method may include immersing a conductive asymmetric porous support as a first electrode in a solution which may include electro-polymerizable monomer(s) and applying a first voltage between the support and a second electrode in the solution whereby the electro-polymerizable monomer(s) are polymerized on a surface of the support to form a first electro-polymerized selective layer. The electro-polymerizable monomer(s) may be electro-crosslinked on the surface of the support.

The solution may include more than one electro-polymerizable monomer(s) which upon applying a first voltage polymerize to form a random copolymer. The solution may further include electro-polymerizable oligomer(s), electro-polymerizable polymer(s) or both. The electro-polymerizable oligomer(s), electro-polymerizable polymer(s) or both may be electro-crosslinked on the surface of the support. The solution may further include non-polymerizable solutes. The solution may be an alkaline aqueous solution. The solution may further include allyl amine, propylamine, benzylamine, ethanolamine or any combination thereof for the electropolymerization of the phenol, phenol derivative or both. These may be added, among other possible reasons in order to provide a uniform film coating for the composite membrane).

The solution may be an alkaline alcoholic solution. The alcohols may include methanol, ethanol, propyl and/or any other water-soluble alcohol.

The solution may be an acidic solution. The solution may further include nonionic surfactants (for example at concentrations of 0.01-10 mM, typically, 0.1-1.0 mM).

The solution may include tetraalkylammoniumperchlorate sodium perchlorate, lithium perchlorate tetraalkylammonium tetrafluoroborate, tetraalkylammonium hexafluorophosphate, tetralkylammonium hexafluoronitrates or any combination thereof, (which may be present in a concentration from 0.01M, for example, from 0.1M to the saturation limit of the electrically conductive solution), wherein the alkyl groups may include, independently, methyl, ethyl, propyl, butyl, pentyl, hexyl, septyl, octyl or any combination thereof.

The method may include applying a second voltage between the support and the second electrode in the solution, wherein the second voltage is higher than the first voltage, whereby electro-polymerizable monomer(s), which are polymerizable at a second voltage, polymerized on a surface of the first electro-polymerized selective layer to form a second electro-polymerized selective layer. The first electro-polymerized layer may include an electronically conductive film and the second electro-polymerized layer may include a non-conductive film. The first and second electro-polymerized layers may include electronically conductive films. The first and second electro-polymerized layers may include non-conductive films.

A thin film coatings may be applied by electro polymerization on the top relatively dense layer and/or within the intermediate layer of the porous supports (for example, an UF support). The thin film polymer may have both oxidant stability, stable rejections and stable high flux.

In some embodiments, there is provided a composite membrane which may include a thin selective barrier made by electropolymerization process(es) on a conductive porous support. In some embodiments, electro-polymerization was surprisingly found to be useful in RO and/or NF membranes having an improved combination of selectivity and/or rejection with chemical stability and particularly improved oxidant stability. In other embodiments, electro-polymerization was surprisingly found to be useful in ultrafiltration and/or microfiltration membranes with enhanced nonfouling and selectivity characteristics over the state of art. In other embodiments, there are provided herein improved oxidant stable NF and/or RO membranes, and/or RO membranes with improved boron rejection, and or urea rejection, and or nitrate rejection.

According to some embodiments, monomers dissolved in water and/or solvent or solvent mixtures, can be electropolymerized on electrically conducting porous supports resulting in a crosslinked, stabilized selective thin (for example between 1 nm to 10 micron, typically between 20 nm to 1 micron) film on the surface of the support membrane. The selective layer may be preferably oxidant stable and may have the characteristics of an NF and/or RO membrane. Stability may also be achieved, for example, by one or more of the following processes: a) chemical and/or heat post-treatment which may rearrange the morphology of the membrane to induce stabilization, b) self crosslinking during and/or after electro-polymerization, c) subsequent coating, and d) a binding reaction to the support or/and other polymers applied or found on the surface of the porous support prior to electropolymerization.

According to some embodiments, there are provided composite membranes having between 80%-100%, preferably over 90%, and most preferably over 95%, rejection to sodium chloride (NaCl) and preferably water desalination of over 99% and/or having fluxes of at least 0.5 Lp (liters/meter$^2$/hr/bar) and preferably over 1 Lp.

Various NF membranes can be made according to some embodiments, for example, NF membranes having preferably a MWCO of between 100 to 2000 daltons These membranes may also behave high rejection to organic molecules, partial retention to inorganic molecules and high fluxes of Lp's of at least 1 and preferably around 4 and more preferred in the range of 9 to 10 or higher depending on the MWCO. With the lower MWCO of about 200 having the lower rejections and the higher MWCO NF membranes having high rejections.

According to some embodiments, the membranes according to the disclosure may additionally have selectivity characteristic and may be oxidant stable NF and RO membranes and/or may have characteristics of acid and/or base stability.

The membranes, according to some embodiments of the disclosure, may include a thin coating (for example, 1 to 500 nm thick, particularly 10-300 μm thick) of a layer formed at least partially by electro-polymerization on a porous support which may be in one preferred exemplary embodiment, a UF membrane, for example, an asymmetric UF membrane. The asymmetric UF membrane may be produced, for example, by the process of phase inversion of a polymer solution which contains at least two components. The first component may be a polymer which can undergo phase inversion to form the asymmetric structure and a second component, such as activated carbon, carbon black, graphite powder particles, metal particles, conductive metal oxide particles and/or conductive polymers, which may confer on the membrane formed electronic conductivity. The solution that forms the UF membrane may also contain additional components, such as surfactants and/or block polymers, which may be needed to compatibilize the conductive material with the polymeric matrix material. Optionally, the composite membrane may contain an intermediate layer between the selective film and the UF support, made by coating techniques other than electro-polymerization or by electro-polymerization and multiple layers of the aforementioned combination or other combinations. This intermediate layer may be used to improve adhesion and/or uniformity and/or act as a cutter layer to improve flux, of the selective barrier. In other embodiments of this disclosure, the support of the final composite may be made by processes other than phase inversion, and/or from materials other than primarily organic polymers, such as inorganic oxides used to form ceramic membranes.

A method to form thin film coatings by electro-polymerization on electronically conducting UF supports was surprisingly found, wherein a thin film polymer having rejection characteristics similar to those of NF and/or RO membranes. There is provided herein, according to some embodiments, a use of monomers and/or oligomers and/or polymers dissolved in water or water/solvent or solvent mixtures, which can be electro-polymerized and crosslinked in the case of monomers and oligomers or in the case of polymers crosslinked on electrically conducting porous support(s), which may result in at least partially crosslinked, stabilized thin film on the surface of the support membrane. The stabilization process (and/or changes in the balance of hydrophilic to hydrophobic groups) may include: a) chemical and/or heat post-treatment which may rearrange the morphology, crosslinking and/or may convert chemically active groups into inactive groups and/or change the balance of hydrophilic to hydrophobic groups which may induce stabilization and/or alter the flux rejection characteristics, b) self crosslinking during and/or after electro-polymerization, c) subsequent coating, and/or d) a binding reaction to the support or/and other polymers applied or found on the surface of the porous support prior to electropolymerization.

According to preferred embodiments of this disclosure, electro-polymerization may be used to form composite NF or RO membranes. In other embodiments the NF membrane may have a combination of high flux, high organic rejections selectivity to low molecular weight solutes, and chemical chlorine resistance. In other embodiments, ultrafiltration (UF) and/or microfiltration (MF) membranes with enhanced nonfouling and selectivity characteristics over the state of art are provided. In addition, electro-polymerization may be used to coat the pores of UF and MF membranes with a film to which other materials may be bound, such as biological active agents.

The electro-polymerized selective layer (may also be referred to as a thin selective layer) may include a polymer of monomers which may include monomers containing vinyl groups, and/or polycyclic aromatic groups. In one preferred embodiment, this layer may include divinylbenzene and may be from about 0.001 microns to about 10 micron thick, for example from 0.01 microns to about 1 micron thick. The porous supported may have a mean pore diameter from about 0.001 microns to about 10 microns, for example from about 0.01 microns to about 0.50 microns, and in one case the conductive porous membrane may include a conductive metal layer which is thin enough so that it is porous.

The method of making the composite membrane may include immersing a conductive porous membrane support as a first electrode in an electrically conductive solution, which may include one or more monomers (preferred examples of electropolymerized monomers with vinyl groups, and polyaromatics, such as divinylbenzene, ethylvinylbenzene, styrene, or mixtures thereof), in a concentration from about 0.5M to the concentration of neat monomer(s). The electropolymerization may be electrochemically initiated by applying a voltage (for example, wherein the electric potential is from zero to an absolute value of 5 volts compared to the normal hydrogen electrode) between the conductive porous membrane support as an electrode and a second electrode in the solution.

The electrically conductive solution may include an electrolyte including for example, Tetraalkylammoniumperchlorate sodium perchlorate, lithium perchlorate tetraalkylammonium tetrafluoroborate, tetraalkylammonium hexafluorophosphate, and/or tetralkylammonium hexafluoronitrates present, for example, in a concentration from 0.1M to the saturation limit of the electrically conductive solution. The alkyl groups may for example, methyl, ethyl, propyl, butyl, pentyl, hexyl, septyl and/or octyl. Phenols have been electrochemically polymerized for applications in corrosion protection; deposition of reactive or conductive films production of potentiometric sensors. Appropriate monomers such as phenols bearing carbonyl groups, aliphatic alcoholic functions, and amino groups and 5-hydroxy-1,4-naphthoquinone have used for these applications among others.

A) Categories of the Membranes According to Some Embodiments of the Disclosure:

According to some embodiments, there are provided composite membrane which includes an electronically conductive support and an electro-polymerized selective layer. The composite membranes may be a thin film composite oxidant stable organic membranes for applications primarily for RO and NF, and for some applications in UF and MF.

With respect to composite membranes for RO, the composite membranes may have between 80%-100%, preferably over 90%, and most preferably over 95%, rejection to sodium chloride (NaCl) and preferably water desalination of over 99% and/or fluxes of at least 0.5 Lp (liters/meter2/hr/bar) and preferably over 1 Lp.

With respect to composite membranes for NF, the composite membranes may have a MWCO of between 100 to 2000 with high rejection to organic molecules, partial retention to inorganic molecules and high fluxes. For example, NF membranes according to embodiments of the disclosure may have the following selectivities, without being bound to any particular theory or mechanism of separation. The following solutes used to characterize the NF are given by way of example and are not meant to limit the use of the membranes in any application with any solvent/solute combination. Non-limiting examples for membranes according to embodiments of the disclosure, may include:

1) Membranes characterized by $R(Na_2SO_4)>R(NaCl)>R(CaCl_2)$ with or without high rejection to organic solutes such as glucose or/and sucrose (Possible mechanism may be negative charge Donnan exclusion).

2) Membranes characterized by $R(CaCl_2)>R(NaCl)>R(Na_2SO_4)$ with and without high rejection to organic solutes such as glucose or/and sucrose (Possible mechanism may be positive charge Donnan exclusion).

3) Membranes characterized by $R(Na_2SO_4)>R(CaCl_2)>R(NaCl)$

4) $R(Na_2SO_4)\sim R(CaCl_2)>R(NaCl)$ with and without high rejection to organic solutes such as glucose or/and sucrose (Possible mechanism may be size exclusion and Dielectric exclusion).

4) Membranes having low rejections to salt solutes $R(Na_2SO_4)\sim R(CaCl_2)\sim R(NaCl)$ with high rejections to low molecular weight organics such as glucose and sucrose (Possible mechanism may be size exclusion (for example, for glucose) and ion coupled flow (for example, salts), having, for example mosaic structures.

If the UF conductive support is also solvent resistant and/or stable it may also be used for applications were the solvents are organic or aqueous/organic solvent combinations. Such applications may be used in the chemical, pharmaceutical, beverage, food, electronic and many others fields.

B) Electro-Polymerization:

Embodiments of the disclosure may also relate to the process of electro-polymerization to form selective barriers on conducting porous supports, wherein the final membranes having in one preferred embodiment RO or NF selectivity and oxidant stability. The membrane may include an "electroactive polymer" which may refer to material that can undergo polymerization, for example, electrochemically or otherwise polymerized, onto a surface from a monomer solution, which polymer may exhibits variable physical and/or chemical properties resulting from a chemical reaction within the polymer, upon the application of an external electrical potential. Various monomers may be electro-polymerized to form films which have NF and/or RO selectivities.

Electropolymerization may proceed by different mechanisms, for example:

1) An oxidative step which then forms radicals which initiate free radical polymerization of monomers such as styrene, divinylbenzene, methylmethacrylate.
2) Electropolymerization by oxidation to form radicals on phenoxide groups, which then proceeds to polymerized by oxidative coupling.
3) Electropolymerization through anionic addition reactions.
4) Electropolymerization through cationic addition reactions.

All the mechanisms discussed herein may be employed according to embodiments of this disclosure. One preferred embodiment is electropolymerization by oxidation to form radicals on phenoxide groups, which then proceeds to polymerized by oxidative coupling.

A preferred structure for NF and RO membranes may include that contains aromatic groups, polar groups, hydrogen bonding groups and crosslinks.

Examples of Electropolymerization Mechanism "1" Above:

Oxidation of aliphatic carboxylate ions at the anode most probably results in the formation of acyloxy radicals which readily lose carbon dioxide to form the hydrocarbon radical. Dimerization of these hydro-carbon radicals formed in high concentration around the anode readily follows. Similarly, electrolysis of alkyl or aryl Grignard reagents liberates at the anode the corresponding radicals which dimerizes, dis-proportionate, or react with the ether solvent. In the presence of vinyl monomers, radicals formed by the Kolbe reaction readily initiate polymerization and copolymerization. The radical mechanism underlying these polymerization reactions was established from the composition of copolymers formed thereby and from observed inhibition by known radical scavengers such as diphenylpicrylhydrazyl.

Examples of Electropolymerization Mechanism "3"

Initiation of vinyl polymerization at the cathode has also been effected by electrolyzing tetraakylammonium salts, but the reaction appeared to be anionic rather than free radical in character for the copolymerization of acrylonitrile and methyl methacrylate. Similarly, the electrolysis of tetraethylammonium tetrafluoroborate in the presence of both acrylonitrile and styrene initiates an anionic polymerization reaction in the cathode compartment and a radical polymerization reaction in the anode compartment.

Examples of Electropolymerization Mechanism 4:

The Results from the electrolysis of silver perchlorate in the presence of styrene, N-vinylcarbazole, or isobutyl vinyl ether were interpreted in favor of a carbonium ion mechanism a pure carbonium ion mechanism would require rapid dimerization of the ion-radicals formed in the proposed electron transfer reaction Example of Electropolymerization Mechanism "2":

The electropolymerization of phenols are disclosed in J. Electrochemical Soc. V 134 No 12 Dec. 1987 pp 643C-652C, which is incorporated herein by and reference. Different techniques are describe for the electrolytic polymerization of phenols. In one approach phenols are polymerized by anodic oxidation rather than by oxygen employing the CuCl amine catalyst, in water-organic solvent mixtures. Phenols can be oxidative polymerized either in the molten state or diluted with minor amounts of non-aqueous solvents.

Typically, in phenol derivative electropolymerization a constant voltage was applied between the metal anode and a suitable cathode, although linear increase of the voltage, controlled potential electrolyses, and cyclic voltammetry can also be used. It is claimed, especially in the disclosure literature that any metallic or nonmetallic electro-conductive material can be coated. The electropolymerization process were found to be sensitive both to the composition of the metal electrodes to be coated and to the procedures adopted for cleaning their surface, which involved degreasing with organic solvents, followed in some instances by washing with either alkaline soaps or acid solutions.

Choice of monomer for phenol derivative electropolymerization—a basic requirement for commercial polyoxyphenylenes obtained by non-electrochemical syntheses is that they should be as highly linear as possible in order to be processable. Since no way has yet been found of synthesizing linear polymers from cheap monomers such as phenol or cresol, 2,6-disubstituted monomers such as 2,6-dimethylphenol and 2,6-diphenylphenol had to be chosen as starting materials. When polyoxyphenylenes are both synthesized and directly deposited as coatings in a single stage, not only is linearity unnecessary, but crosslinked polymers are more likely to provide a strong barrier stable selective thin barrier for the composite membrane. Thus, polymerizing phenol itself and phenol derivatives which can form crosslinked films may be preferred.

From the technical literature, as expected for cross-linked polymer networks, the coatings obtained from phenol under a variety of experimental conditions were insoluble in common organic solvents. The importance of achieving a crosslinked structure is usually obtained by having at least two ortho or para-positions free from substituents. These derivatives may be one preferred choice of starting materials for this disclosure.

For different applications it may be useful to increase the molecular weight of the coated material after electropolymerization by thermal curing, commonly adopted procedure for many kinds of coatings. This is possible when the selected monomer contains a function which can be thermally activated, for example, an allyl group. For example 2-allylphenol can be electropolymerized, with a major fraction insoluble in acetone and to have average molecular weight, for example, in the range 2000-3000. It was apparent that 2-allyl substituents strongly depressed the coupling of the o-position, leading to essentially linear polymers. However, after 30 min curing at 150° C., these coatings become crosslinked and resistant to organic solvents.

As in chemical synthesis, many phenols may be anodically electropolymerized. However, dihydroxybenze which can be converted into quinones are not suitable for either chemical or anodic oxidative coupling. Halogen-substituted phenols were found to be electrochemically polymerizable (and copolymerizable) by oxidative coupling and oxidative displacement. Copolymer coatings were obtained by anodization mixtures of phenols. The composition of the deposited copolymer depended on both the relative concentration of the monomers and their oxidation potentials, the easily oxidizable phenol entering the polymer chain preferentially.

Choice of Reaction Medium:

Several different solvent electrolyte combinations may be used for polyoxyphenylene coatings. The choice of reaction medium can be as influential as the monomer or the properties of the coatings. For example:

Molten Phenol; Nonaqueous Solutions:

Phenols are polymerized onto Fe electrodes by anodizing the liquid monomer (at around 60° C.), made conductive by adding either alkali metal hydroxides or organic bases. Despite such additions, very high voltages are required: 30-300V. Organic solvents such as alcohols, glycols, DMF, nitrobenzene, acetone, acetonitrile, and dichloromethane are compatible with the process. In both instances poor localization of the polymer growth at the metal surface was observed. Indeed 50 to 70 Farads were needed to deposit 1 mole of phenol, as compared with the theoretical stoichiometry of 2 Farads/mole. When using 2,6-dimethylphenol or p-cresol as, monomer, the resulting polymer may be entirely soluble in the reaction media. The presence of even small amounts of water prevented coating formation, may be because the oxidation of phenols being competitive with that of water, the latter may decrease the mole weight of the polymer.

Alkaline Aqueous Solutions:

The use of alkaline solutions was found to overcome problems connected with polymer solubility and although current consumption is high (10-20 F mole-$^1$), coatings several microns thick are obtained by constant voltage electrolysis (35-100V for 60 min) of aqueous solutions containing 0.1M phenol 0.01M NaOH. Despite the high voltage and the highly conductive electrolyte, initial current densities are low mA cm$^{-2}$, and during polymer deposition, the current was reduced to out one-third of the initial value, as only insulating coating is achieved. The coating thickness increases with increasing voltage and decrease with increasing monomer concentration because monomer oxidation is competitive with that of the growing polymer chains. The coating material is chemically characterized with a prevalence p-substitution, the coatings formed by potentiostatic electrolysis at +0.85 and +1.25V (SHE) may be thick and highly cracked when excess NaOH is used, but thin and continuous when phenol is at equimolar with NaOH.

Alkaline Alcoholic Solutions:

Methanol and other alcohols have been tested for the electropolymerization of phenols. The coatings obtained from 2,6-dimethyloxyphenylene on the support electrodes are adherent, insulating, hydrophobic, yellow-blue films, the thickness of which ranging from 0.5-0.1 micron. This dishomogeneous thickness is due to local variations in the electric field. 3-5-Dimethylphenol was also polymerized, giving however a different polymer with respect to that produced from the 2,6-isomer. Coupling in ortho rather than in p-position occurred as the main process when both m-positions were occupied.

The electropolymerization of several esters and amido substituted phenols can also be used in NaOH methanol mixtures. The results show that the methanol-NaOH electrolyte allows the synthesis of well-characterized coatings which, which are adherent and homogeneous but thinner (1 micron or less) than that found in alkaline solutions. The achievement of thicker polyoxyphenylene coatings requires a different environment.

The main function of the amine, at least in hydro-alcoholic media, may be that of keeping the growing polymer layer rather hydrophilic, permeable to the monomer approaching the electrode, and sufficiently conductive. The presence of an inorganic layer on the metal electrode does not necessarily prevent electro-chemical polymerization of phenols.

Hydro-alcoholic solutions containing amines: The use of water as a solvent has clear-cut practical advantages such as the absence of toxicity and fire hazard, apart from the lowest cost. However, the addition of some methanol (or higher alcohols) may sometimes be necessary in order to achieve sufficient solubility of the monomers when they are substituted phenols such as 2-allylphenol. The water/methanol ratio was found to affect the properties of the synthesized polymers. For instance, in the case of 2-allylphenol, increasing the amount of methanol gave coatings consisting of increasing insoluble fractions and of soluble fractions of higher molecular weight. The formation of higher polymers in the better solvent indicates that polymer precipitation was the main termination step of the process. The effect of temperature increasing also leads to less soluble coating. Allyl amine most versatile amine allowing electropolymerization of many phenols unto different porous supports while propylamine, benzylamine, and ethanolamine often will be used as a copolymer with phenol with one of its derivatives (for example, 2-chlorophenol) in order to coat to give a uniform film for the composite membrane. Examples of the procedures that can be used:

By electrolyzing a water-methanol (30%) solution containing 1.2M phenol, 0.7M allylamine, and 0.15M methoxyethanol with applied voltages in the range 2.5-4.5V a smooth current decrease was observed while a thick polymer coating formed. At higher voltages, however, fast passivation took place and porous support becomes coated with much thinner films (0.5-2 microns) produced with current yields far below the theoretical one. This fall in performance did not occur when the selected monomer was 2-allylphenol.

Thus, hydro-alcoholic allylamine-2-allylphenol solutions may be chosen for fast coating operations yielding thick films in times comparable to those electrophoretic processes (for example, 5 min). The coating thickness achieved in a fixed electrolysis time linearly increased with the concentration of phenol in the range 0.3-1.0 M, whereas current was constant. With 2-allylphenol, the molecular weight of the deposited polymer was also depended on monomer concentration, being higher for more dilute solutions. Such dependence probably also holds also for polymers obtained from phenol which formed insoluble polymers.

Increasing concentrations of allylamine, at fixed concentrations of phenol and voltage, led to slower current decrease, provided the amine-phenol molar ratio Without being bound by any theory it may be suggested that:

1) Adsorption of the amine inhibits metal oxidation while still allowing other electrode reactions such as monomer oxidation and water discharge. This inhibition does not occur when the amine is described as a result of the application of high voltage.

2) The formation of insulating oxides being prevented, progressive passivation of the electrode is only due to the formation and thickening of a polymer layer. Its growth is stopped only after a considerable thickness has been reached, because the high surface concentration of the amine, which separates phenoxide anions, prevents the formation of a continuous film and, at least for certain monomers, the amine bonded to the polymer chains makes the polymer hydrophilic.

3) Allylamine may also be active during thermal curing of the coatings, providing cross-linking of the polymer chains through the easily oxidizable allyl group.

Thus, a main function of the amine, at least in hydro-alcoholic media, may be that of keeping the growing polymer layer rather hydrophilic, permeable to the monomer approaching the electrode, and sufficiently conductive. The presence of an inorganic layer on the porous electrode does not necessarily prevent electro-chemical polymerization of phenols.

Acidic Solutions:

Not attractive for metals because of corrosion. That phenol can be electropolymerized at inert electrodes (Pt or graphite) in oxalic acid medium was demonstrated by cyclic voltammetry of 0.19M phenol in 0.24M oxalic acid+0.12M ammonium oxalate hydro-alcoholic solution (pH=2.5) (18). Phenol oxidation, occurring either before (graphite) or at the potential of discharge of the supporting electrolyte (Pt), led to passivation of both electrodes by polymer films.

Electropolymerization under acidic pH (2.5) can also occur. For example polymerization of a two-layer coatings were formed by anodizing the porous electrode in oxalic acid-phenol mixtures, the underlying oxalate layer being stabilized by the polyoxyphenol formed on top of it. The polymer layer, which became hydrophobic by thermal curing, made these coatings even more stable. The maximum attainable thickness of the polymer layer was found to increase with monomer concentration, in agreement with the behavior observed in basic solutions, being about 1 micron for 0.19 M phenol concentration and rising to 10 microns when phenol is more concentrated than 0.5M. The coating characteristics may also be modified by several additives: for example, sodium silicate improves adhesive and sodium sulfite.

It was found that the adhesion and elasticity of thick polyoxyphenylene coatings synthesized from hydroalcoholic solutions was strongly dependent on the monomer and thermal curing of coatings obtained from phenol on the porous conductive supports coatings with polymers m 2-allylphenol resisted repeated deformations without marked loss of adhesion. Marked improvement in adhesion was also obtained with addition of low concentrations (0.1-1.0 mM) of nonionic surfactants, such as Triton.

When present at the indicated concentrations, Triton does not affect electrode reactions, leaving current transients, current yields, polymer thickness, and stability unchanged. Comparable results are achieved by using poly-ethylene glycol (molecular weight 600-14,000) instead of Triton. Relatively high concentrations of polyethylene glycol (2% w/v) must be used because of its lack of surface activity. However, at this concentration, it is found to enhance adhesion of the coatings better than Triton. Triton, being stored at the metal surface, behaves as abridge between the metal and the polymer layer strongly increasing the area of contact. However, since its adsorption does not involve complete desorption of allylamine and as Triton itself is hydrophilic, the growing polymer coatings maintain enough hydrophilicity to ensure that high thickness is reached. Thus the procedures of this disclosure can be practiced with also the addition of surfactants to the monomer solutions.

Other non-limiting examples are electro-polymerizable monomers may be chosen from pyrrole, thiophene, aniline, carbazole, azulene, furan, their derivatives and mixtures. Specific examples are pyrrole, N-methylpyrrole, thiophene, and 3-methylthiophene. Pyrrole and N-methylpyrrole have lower oxidation potentials and therefore polymerize more easily at lower voltages to produce relatively uniform films. Higher oxidation potential monomers such as, for example, thiophene and 3-methylthiophene polymerize with greater difficulty at higher voltages producing non-uniform films.

A limitation on the use of electroactive polymer coated conductive substrates maybe that electrochemically deposited conductive polymers may be easily removed from conductive substrates by contact with a solvent or mechanically by moderate abrasion. Furthermore, the electrochemically deposited films generally have a non-uniform topography, limited solubility in common solvents, and widely ranging electrical conductivities. When this occurs a method for improving the adhesion between conductive substrates and electrochemically deposited films may be applied such as described in U.S. Pat. No. 5,100,523, which is incorporated herein by reference in its entirety, for example, by the use of amorphous carbon to promote adhesion between electroactive polymer films and conductive substrates. In effect an interposed layer of amorphous carbon promotes the adhesion between conductive substrates and electrochemically deposited polymers. Such a carbon layer may be deposited directly onto the conductive substrate by conventional methods such as, for example, chemical vapor deposition. The subsequently applied electrochemically deposited polymer adheres more tenaciously to the amorphous carbon coating than if it had been electrodeposited directly onto the conductive substrate. This approach is also included in the disclosure by reference. In effect the use of a layer of amorphous carbon to promote adhesion between electroactive polymer films and conductive substrates.

In the preparation of composite membranes having a discriminating layer prepared from an electrochemically initiated polymerization according to this disclosure a conductive porous support is electrically connected to a source of electric current. The conductive porous support is then contacted with a polymerizing solution. The conductive porous support serves as an electrode of an electrolytic cell. The porous support must be of an electrically conductive material, or rendered electrically conductive by for instance plating the porous support with a conductive layer of a metal or other electrical conductor. The conductive layer must be sufficiently thin so as to not block the pores on the surface of the porous support.

In one embodiment the electrolytic cell containing the porous support as one electrode is charged with a polymerizing solution of an electropolymerizable monomer, or a mixture of electropolymerizable monomers as described above which are effective for the formation of composite membranes. A thin selective layer is then formed when a voltage is applied from monomers based on phenols and phenol derivatives and/or from monomers selected from the group consisting of non ionic or polar monomers containing vinyl groups, and polycyclic aromatic groups and polar and ionic monomers such as styrene sulfonic acid, vinyl sulfonic acid, vinyl phosphonic, styrene phosphonic, acrylic acid, styrene carboxylic acid, vinyl phenol, vinyl acetate, or other ionic or polar monomers or mixtures thereof. In one preferred case the layer formed by the electropolymerization process is from 0.01 microns to 1 micron thick. The porous supported has a mean pore diameter from about 0.001 microns to 0.50 microns, and in one case the conductive porous membrane may include a conductive metal layer which is thin enough so that it is porous.

In the above paragraph the choice of monomers forms insulating layers. If the electropolymerization is first carried out with monomers such as pyrrole or thiophene or aniline derivatives that forms a conducting layers then a subsequent layer of an insulting polymer may be added as described above.

The electrolytic cell is charged with a polymerizing solution of an electropolymerizable monomer, or a mixture of electropolymerizable monomers, effective for the formation of composite membranes. The polymerization mechanisms reported for electrolytically initiated polymerization are ionic polymerization, both cationic and anionic, and free radical polymerization. More information may be found in Encyclopedia of Polymer Science and Engineering, Electrochemical Initiation, John Wiley & Sons, New York, Vol. 5, p. 591, (1986), which is incorporated herein by reference in its entirety. These polymerization initiation species are formed as current flows between electrodes.

Also included as one preferred mode of forming the selective barrier is the oxidative polymerization of phenol and phenol derivatives which require different conditions than the polymerizations described in the previous paragraph on vinyl monomers.

For the polymerization based on vinyl monomers the solvent of the polymerization solution and components of the solution must be carefully selected and prepared as with any carbanion, anionic or free radical initiated polymerization. Common precautionary measures known in the art of ionic polymerization reactions include purified reagents to remove ion, or free radical (as the case may be) scavenging species, including protic species such as water. The solvent must also be electrochemically inert at the voltages applied. Solvents generally found suitable include N,N-dimethylformamide, dimethylsulfoxide, acetonitrile, and mixtures of such solvents.

Effective concentrations of monomer in the polymerization solution may range from 0.1M to pure monomer. Generally the monomer will not be sufficiently electrically conductive to effectively initiate the electropolymerization. In the general circumstance, it is necessary to add electrolyte to the polymerization solution. However, electrolytes are seldom soluble in the monomer in effective amounts. Therefore, it is frequently necessary to employ a solvent to dissolve an effective amount of electrolyte in the polymerization solution. The presence of solvent dilutes the otherwise neat monomer. Thus, the upper monomer concentration is limited by the solubility of the electrolyte in the neat monomer, and the solvent chosen for the electrolyte. Advantageously the monomer concentration ranges from 1M to 10M. Preferably, the electrolyte is dissolved in neat monomer.

The concentration of monomer in the polymerization solution influences properties of the resulting polymerized film. The rate of ionic polymerization is known to be directly proportional to the concentration of monomer in the polymerization solution. Electrochemically initiated polymerization may form ionic species either cationic or anionic. Once the ionic initiation species is formed electrochemically, the polymerization follows an ionic polymerization. Consequently, the monomer concentration in the polymerization solution also influences the polymerization rate for electrically initiated polymerization.

Similarly for free radical polymerization, the monomer concentration of the polymerization solution also influences the polymerization rate. Where electrochemical initiation forms free radicals, the rate of polymerization is also influenced by the monomer concentration in the polymerization solution.

A second observed effect of monomer concentrations relates to the polymer films. Films prepared from polymerization solutions having low concentrations of monomer, or monomer mixtures, have an opaque and powdery appearance, are porous, and therefore unsuited for use as a discriminating layer for composite membranes. In contrast, membranes from more concentrated monomer solutions are more transparent and less porous. For monomer mixtures of divinylbenzene and ethylvinylbenzene of a ratio of about 1.1 to 1, suitable membrane formation occurs at total monomer concentrations of above 0.5M. A Porous polymer layer is formed from total monomer concentration of the divinylbenzene and ethylvinylbenzene of less than 0.45M in the ratio of 1.1 to 1.

Higher concentrations of monomer also result in thinner polymer layers on conductive surfaces. As observed above, the thickness of the nonporous discriminating layer directly reduces the permeability of the membrane. Hence, for composite membrane purposes, monomer concentrations should be sufficient to produce thin, nonporous polymer layers in electrochemically initiated systems.

Desirable electrolytes are readily soluble in the solution of monomer(s) and solvent. The ions of a suitable electrolyte have a high degree of mobility, and the ions have a numerically high discharge potential. Frequently used electrolytes include perchlorates, including tetraalkylammonium, sodium and lithium, tetrabutylammonium tetrafluoroborate, hexafluorophosphates, and nitrates such as tetrabutylammonium nitrate.

With styrenic monomers, the concentration of electrolytes influences the thickness of the polymer film formed such that as the concentration of electrolyte decreases the thickness of films formed increases. Operable concentrations of electrolyte are between about 0.1M and the saturation limit of the electrolyte in the solvent monomer system. The saturation limit is typically less than 5M. Therefore useful electrolyte concentration limits are usually between 0.1M and 5M. In general it is preferable to have as high a concentration of electrolyte as possible because higher electrolyte concentrations yield thinner polymer films.

Applied voltage for formation of an electrochemically initiated membrane discriminating layer is consistent with voltage of known electrochemical reactions which ranges from zero to an absolute value of 5 volts with respect to the normal hydrogen reference electrode. Reference electrodes useful in the electropolymerization could be the normal hydrogen electrode, the saturated calomel, the silver/silver chloride or other suitable standard electrode. However these electrodes use aqueous electrolytes which leak water into the polymerization solution. For this reason, a silver wire quasi-reference electrode is preferable.

Whether the electrical potential is positive or negative with respect to the reference electrode (that is whether the porous electrically conductive membrane support, the working electrode, is the anode or the cathode of the electrolytic cell) depends on whether the species is advantageously polymerized by an anionic or cationic polymerization mechanism. Styrene, for instance, is known to polymerize by anionic, cationic or free radical mechanisms from electrochemically initiated polymerization. For free radical polymerization initiated by electrochemical means, the working electrode can be either positive or negative with respect to the reference electrode.

The voltage may be applied to the electrodes of an electrolytic cell at a predetermined level, or varied over a cycle from an initial potential, including zero over a range of voltage to a final value including zero. The duration of the voltage applied to the electrodes necessary to deposit an effective discriminating layer on a porous membrane support is relatively short. The time can vary from a few microseconds to several minutes, even 5 minutes in dilute monomer solutions. As will be seen below from the examples illustrative of this disclosure, membrane discriminating layers are effectively formed after a brief applied voltage.

Electrochemical initiation of polymerization is effective over a wide range of temperatures. The electrochemically initiated polymer layer is conveniently formed at room temperature and atmospheric pressure. The temperature limits of the polymerization are those for which the monomer solvent of the electrolytic cell is a liquid. Pressure and temperature deviation from ambient conditions for the electrochemically initiated polymerization while operable are not advantageous.

Discriminating layers for composite membranes formed according to this disclosure are very thin. Discriminating layers may range from about 1 .mu.m to about 0.01 .mu.m. The discriminating layers are capable of bridging porous structure of the conductive support. Conveniently the pore diameter of the conductive support is less than 0.25 .mu.m. Advantageous pore diameters range from about 0.1 .mu.m to as small as 10 angstroms. Pores as large as 0.50 .mu.m can be bridged by electropolymerized discriminating membrane layers. However, the thickness of the polymerized discriminating layer required to bridge large pore diameters could adversely effect the overall flux of the resulting composite membrane. Therefore advantageously the pore diameter of the supporting membrane is from about 0.1 micron to about 10 angstrom.

Other non-limiting examples of electro-polymerizable monomers that may be used in the disclosure to coat the conductive support with a first conductive layer upon which a nonconductive layer may be deposited may be chosen from pyrrole, thiophene, aniline, carbazole, azulene, furan, their derivatives and mixtures. Specific examples are pyrrole, N-methylpyrrole, thiophene, and 3-methylthiophene. Pyrrole and N-methylpyrrole have lower oxidation potentials and therefore polymerize more easily at lower voltages to produce relatively uniform films. Higher oxidation potential monomers such as, for example, thiophene and 3-methylthiophene polymerize with greater difficulty at higher voltages producing non-uniform films.

Other monomers that may be used in the disclosure for forming RO and NF membranes by the process of electropolymerization on conductive supports may be found in U.S. Pat. No. 5,186,813, which is included herein by reference in its entirety. In effective the electrochemical polymerization is that of pyrrole to polypyrrole, and the resulting polymer an electrical conductivity of ~100 Scm$^{-1}$. This coating is electro active and has a reversible oxidation and reduction by applying an electrical potential from about 0.8 volts to about −0.6 volts with respect to a saturated calomel electrode. Such electro-active and or conductive polymers can be formed on conductive substrates by electrochemical techniques with applications in for example electro-chromic devices, "smart" windows, optical switches for information processing and charge coupled devices, electromagnetic interference devices, semipermeable membranes, catalytic electrodes, gas sensors, photovoltaic components, solid batteries, diodes, fast response non-linear optical materials, and electrostatic dissipation devices. Surprising, however there are no citations, examples of using electropolymerization for forming either oxidant or non-oxidant stable RO and NF membranes with or without good selectivity and flux characteristics.

One limitation of depositing electro-polymerization of polymers on a conductive support is achieving a uniform thickness and topography, with good adhesion and uniform electrical conductivity to the support. In one approach to overcoming this problem and to achieve uniform thickness and topography, with good adhesion and uniform electrical conductivity on the support, U.S. Pat. No. 5,186,813, laminate two electropolymerized polymers in series. The teachings of this disclosure are incorporated in the disclosure by reference. In effect "the electroactive laminate may include a conductive substrate, a first layer of an electroactive polymer prepared from a first monomer having an oxidation potential, the first layer being adhered to the conductive substrate, and a second layer of an electroactive polymer prepared substantially from a second monomer having an oxidation potential greater than the oxidation potential of the first monomer, the second layer being adhered to the first layer. Thus, the teachings of U.S. Pat. No. 5,186,813 may be used to form an intermediate layer on coating porous conductive supports and preferably asymmetric porous conductive supports and most preferred such asymmetric porous supports made by the process of phase inversion for making permselective membranes especially RO and NF membranes with a unique combination of selectivity and chemical stability.

The electro-polymerizable monomers and monomer combinations disclosed in U.S. Pat. No. 5,186,813, which is incorporated herein by reference in its entirety, for treating porous supports electrochemically prior to the final electrochemical treatment of a nonconductive selective layer. In effect:

1) p-aminothiophenol, aniline. A combination of a first surface of p-aminothiophenol to improve the adhesion of a second deposited polymer film.

2) A continuous process for forming a homogeneous, uniformly thick polypyrrole polymer or copolymer film. Pyrrole monomer, which may be mixed with other co-monomers such as thiophene in ratios from 1:99 to 99:1, is added to an electrochemical cell containing a solvent and an electrolyte. The polypyrrole film is electrochemically polymerized onto a continuously moving anode which is immersed and moving through the electrolyte solution. The electro-polymerization is carried out at a constant current density sufficiently high so as to electro-deposit a singular, homogeneous layer of the copolymer of pyrrole and the co-monomer. A second layer of polypyrrole polymer or copolymer may be electrodeposited by the disclosed process onto a first layer of an electrically conductive polymer (which functions as the anode) such as polyacetylene or polyphenylene, thereby forming a two-layered polymer structure. Such a process may not be used, however, to deposit a first layer of polypyrrole and a second layer of the polymerized comonomer. The higher oxidation potential monomer is generally present in the electrolyte solution at a concentration from about 0.005 to about 0.5 mole per liter, although the operable concentration for any particular higher oxidation potential monomer may deviate substantially from this general range. The lower oxidation potential monomer is present generally at a concentration from about 0.001% to about 1% of the concentration of the higher oxidation potential monomer, although its concentration is not sharply critical to the practice of the present disclosure and may therefore deviate substantially from these limits. More processes may be found in U.S. Pat. No. 4,468,291, which is incorporated herein by reference in its entirety.

Example of Electropolymerization is performed in a single compartment electrolysis cell, utilizing a monomer, an organic solvent, and an electrolyte. Either pyrrole or N-methylpyrrole is used at a concentration of either about 0.1 moles per liter or about 0.2 moles per liter; acetonitrile is used as the organic solvent; and either lithium tetrafluoroborate or lithium perchlorate is used as the electrolyte at a concentration of about 0.1 moles per liter. Current densities are held constant between about 0.08 mA/cm$^2$ and about 0.3 mA/cm$^2$. All solutions are first deaerated by bubbling argon through the cell for about one half hour prior to use. The counter electrode is gold mesh. Cell control is maintained by an EG&G Princeton Applied Research Model 273 potentiostat/galvanostat. Variable temperature control between about −20 .degree. C. and about 30 .degree. C. is maintained through the use of a Thermoelectrics Unlimited Model SK-12 Stir-Kool unit. Thus, electroactive polymer films having thicknesses from bout 500 Angstroms to about 2,000 Angstroms are electrochemically deposited onto the amorphous carbon layers. The morphology of the electroactive polymer films is studied utilizing a JEOL JSM840A scanning electron microscope operated in secondary electron, backscattering topography, and Z-contrast imaging modes. Filamentary electroactive polymer structures are absent, in contrast to the filamentary structures observed for electroactive polymers electrochemically deposited onto bare fluorine-doped tin oxide coated glass supports. Backscatter topography reveals electroactive polymer films having a high degree of surface uniformity and smoothness. Z-contrast imaging indicates compositionally homogeneous electroactive polymer films.

Other phenol derivatives which may be used are p-aminothiophenol 3-methyl-4-chlorophenol, dichlorophen, o-phenylphenol, m-phenylphenol, p-phenylphenol, 2-benzyl-4-chlorophenol; 3,5-dichlorophenol, 2,5-dichlorophenol, 3,5-dibromophenol, 2,5-dibromophenol, 2,5-(resp. 3,5)-dichlorobromophenol, 3,4,5-trichlorophenol, tribromophenol, trtrachlorophenol, 3-methyl-4-chlorophenol; chlorinated hydroxydiphenylethers such as, for example, 2-hydroxy-3,2'4'-trichlorodiphenylether; phenylphenol (o-, m-, p-), 4-chloro-2-phenylphenol, 4-chloro-2-benzylphenol, dichlorophene, hexachlorophenederivatives of poly-phenol such as bis-phenol fluorene derivatives, bis-phenol A, bis-phenol F, bis-phenol S, resorcin, and catechol, and derivatives of alkyl phenols. 3-methyl-4-chlorophenol, dichlorophen, o-phenylphenol, m-phenylphenol, p-phenylphenol, 2-benzyl-4-chlorophenol; derivatives of poly-phenol such as bis-phenol fluorene derivatives, bis-phenol A, bis-phenol F, bis-phenol S, resorcin, and catechol, and derivatives of alkyl phenols. In addition to phenol derivative naphthol derivatives may also be used.

Other monomers and oligomers that can be electropolymerized are for example disclosed in U.S. Pat. No. 4,272,346, which is incorporated herein by reference in its entirety. For example monomers or oligomers such as acetylene-terminated polyimide (ATI) intermediates, acetylene or nitrile terminated polyquinolxaline (ATQ) oligomers and of 4-aminophtalic acid, vinyl phosphonated, Bix-2-chloroethyl vinyl phosphonate, dimethyl allyl phosphonate, trimethallyl phosphite and diallyl phosphite are examples of other unsaturated organophosphorus compounds, Vinyl trimethyl phosphonium bromide, Bromostyrene, chlorostyrene, and 2,3-dibromopropyl acrylate and methacrylate. The acetylene end-capped quinoxaline oligomers can similarly be electropolymerized on carbon and graphite. In the case of 4-aminophtalic acid, it has been postulated that an electron transfer from the carboxylate anion leads to the initial formation of a radical cation which can cyclize to form the aminophthalic anhydride. The anhydride subsequently reacts with the monomer to produce polyimides. Such polymer formation can occurs on graphite carbon electrodes.

In addition to monomeric phenols oligomeric and polymeric poly(phenol) derivatives which may be used in the disclosure. In particular water soluble or water dispersible poly{4-vinylphenol} derivative or an acid salt of a poly{4-vinylphenol} derivative the Z moieties being present in sufficient total amount that the compound is water dispersible.

C) Conductive Porous Supports:

C1) The following methods may be used to make conductive UF membranes for carrying out the electro-polymerization. The substrate may be prepared by casting from solution of a membrane forming polymer containing conductive particles (for example, metal or active carbon, carbon black, or conductive nano-tubes, graphite, or "Bucky-balls" ranging in size from micron to submicron to nano-dimensions in concentrations above the percolation point needed for conductivity). 2) Alternatively the UF support may be formed from non conductive materials such as engineering plastics, in particular polysulfone, polyether sulfone, polyphenylene sulfone, polyetherimides, polybenzimidazole, etc., and then coated on the upper surface of the support to give a conductive porous support for electropolymerization.

For casting procedures reference may be made to for example U.S. Pat. No. 4,029,582, GB 2,000,720, Office of Saline Water R & D Progress Report No. 359, October 1967, U.S. Pat. No. 3,556,305, U.S. Pat. No. 3,615,024, U.S. Pat. No. 3,567,810, and "Reverse Osmosis and Synthetic Membranes" Ed. Sourirajan, which are incorporated herein by reference in their entirety. Thus, for example, the polymer may be dissolved in a suitable solvent (or mixture of solvents), such as NMP, DMF, DMSO, hexamethylphosphoramide, N,N-dimethylacetamide or dioxan (or any of these containing additives such as cosolvents, partial solvents, non-solvents, salts, surfactants or electrolytes. Such additives, which may be exemplified by (for example) acetone, ethanol, methanol, formamide, water, methylethylketone, triethyl phosphate, sulfuric acid, HCl, partial esters of fatty acids, sugar-derived alcohols and their ethylene oxide adducts, sodium dodecyl sulfate (SDS), sodium dodecylbenzene sulfonate, NaOH, KCl, $ZnCl_2$, $CaCl_2$, $LiNO_3$, LiCl and $Mg(ClO_4)_2$, may alter or modify the membrane morphology, and its flux and rejection properties. In addition polymers which are pore formers, membrane hydrophilizers, and/or increase the casting solution viscosity may be added to the casting solutions. Preferred embodiments are polyvinylpyrollidinone, polyalkyoxazolines wherein the alkyl group may be either methyl or ethyl, and sulfonated engineering plastics such as sulfonated polyetheretherketones or polyetherketones or sulfonated polyphenyleneoxides, etc. Surfactants and other compatibilizers such as block co-polymers may be added to aid in the compatibilization of the polymer components and the conductive components. The solution may then be cast on a support material such as glass, metal, paper or plastic, from which it may be removed.

It is presently preferred, however, to cast the solution onto a porous support material from which the membrane is not removed. Such porous support materials may be woven or nonwoven textile materials for example those made from cellulosics, polyethylene, polypropylene, nylon, vinyl chloride homopolymers and copolymers, polystyrene, polyesters such as polyethylene terephthalate, polyvinylidene fluoride, polytetrafluoroethylene, polyether-ketones, glass fibers, porous ceramics and inorganics.

The concentration of polymer in the casting solution may vary as a function of its molecular weight, and may depend on the presence or absence of additives. Typical concentrations lie within the range of 5 to 80%, preferably between 10 and 50%, and more preferably between 15 and 30% wt./vol. The casting temperature may vary from for example −20 .degree. to 100 .degree. C, preferably between 0 .degree. and 60 .degree. C., and may depend on the nature of the polymer, its molecular weight, and the presence or absence of co-solvents and other additives. The preferred application of the polymer solution The casting solution may be applied to the abovementioned supports by known techniques. The wet film thickness may vary between 5 and 2000, preferably between 50 and 800, more preferably between 100 and 500 microns. The wet film and support may then be immersed immediately, or after a partial evaporation step (for example from 5 seconds to 48 hours), under (for example) ambient conditions, or at an elevated temperature, and/or under vacuum, in a gelling bath of a non-solvent. Such baths are usually water, which may contain a small percentage of for example a solvent such as DMF or NMP, and/or a surface active agent such as SDS, the bath being preferably at a temperature within the range of 0 .degree. to 70 .degree. C. A commonly used gelling bath is, for example, water containing 0.5% SDS at 4 .degree. C. In another mode of forming substrate membranes, a polymer solution containing a component that may be leached out by water or another solvent is cast and dried prior to immersion; on immersion, leachable material is removed resulting in a porous membrane. According to another mode of operation, a polymer solution not containing leachable material is cast and dried, resulting in a porous membrane by virtue of the physico-chemical properties of the polymeric material, in which case (for example) a porous structure results from a combination of solvents and/or a subsequent chemical reaction.

The polymer which may be used for making the UF support are especially those made from condensation polymerization for example, polysulfone, polyether sulfone, polyphenylene sulfone, polyetherketone, polyether-ether-ketone, polyether ketone ether ketone, and other variations of polyether ketones and polysulfones. Polyphenylene sulfide, phenylene sulfone and variations of sulfide and sulfone in the same polymer. Poly ethers based on polyphenylene oxide such as 2,6 dim-ethyl phenylene Halo-methylated derivatives of the above polymers on the aromatic or aliphatic groups.

Other polymer for forming the UF support may also be chosen from fluorinated polymers: polyvinylidene fluoride (PVDF), polytetrafluoroethylene (PTFE), poly hexafluoro-propylene (PHFP), polychlorotrifluoroethylene (PCTF), and co and terpolymers of the above such as PVDF-co-PTFE, PVDF-co-PTFE, PVDF-co-PHFP, PVDF-co-PCTF Poly (perfluoro dioxoles) as a homopolymer and copolymers with other fluorinated monomers such as vinylidene fluoride or tetra-fluoro ethylene. Also included are selective membranes based on partially fluorinated polymers alpha substituted and non-substituted tri-fluorinated polystyrenes.

C2) In another mode of forming membranes, a polymer solution containing a component that may be leached out in water or another solvent, is cast and dried before immersion. After immersion, leachable material is removed, resulting in a porous membrane.

C3) In a third variation, a polymer solution without any leachable materials is cast and taken to dryness, resulting in a porous membrane by virtue of the physico-chemical properties of the polymeric material-solvent combination, or by a subsequent chemical reaction that creates pores. All the above methods may be used to form membranes for further modification (coating) as described by the present disclosure.

C4) In another embodiment of this approach the pores of the UF support are first treated to plug or to modify the top pores of the UF support so as to minimize penetration into the pores of the support and/or to improve adhesion of the deposited film. The material which is used to plug the pores may be removed after the coating by electro-polymerization by the application of water under pressure to the skin side of the selective membrane. In one preferred case the polymeric UF membrane is made with additives added to the casting solution of the UF support to enhance the adhesion of the electropolymerized coating to the UF support. Such additives may be organic or inorganic. In one preferred embodiment the additives are zirconium oxide which is known to have interaction with anionic groups such as sulfonic groups. Polymeric additives such as polyvinylpyrollidinone (PVP), which complex with anionic polymers may also be used as additives in the preparation of the UF support. Alternative after the UF support is formed it may be subjected to reactions which introduce groups which would enhance the adsorption of the ionomer unto the UF support. Such groups are amino groups, or cationic groups such as quaternary ammonium or sulfoniums or phosphonium groups. In one preferred mode the amino groups may be added by the process of nitration and reduction or by graft polymerization of monomers which contain anionic interactive groups such as vinylpyrollidinone or triallylamine or diallyamine or vinyl formamide which may then be reduced to amino groups.

C5) Glass supports having a first coating of fluorine-doped tin oxide and a second coating of amorphous carbon.

C6) Porous silver, gold, platinum, copper, aluminum, nickel, chromium, iron, tin, silicon, titanium, magnesium, tungsten, and zinc, as well as alloys and multiple layers thereof may be used as Conductive substrates. Furthermore, such metals may be coated onto a non conductive porous support material (for example, engineering plastics glass, quartz, and plastics such as polycarbonates, polyacrylics, polyesters, polystyrenics, celluosics, and the like, as well as copolymers and laminates thereof) at a thicknesses from about 20 Angstroms to several thousand Angstroms, to form a conductive substrate according to the present disclosure.

C7) In another embodiment the conductive substrates may include a non conductive support material as listed in "3" above with a layer of metal oxide (non-limiting examples, tin oxide, indium oxide, cadmium oxide, antimony oxide, zinc oxide, fluorine doped mixtures with these oxides and the like, as well as mixtures and multiple layers thereof) on at least the surface of the porous support. These metal oxides may be deposited in thicknesses from about 100 Angstroms to several thousand Angstroms.

C8) The conductive substrate may consist of an adhesion promoting layer of electrically conductive high surface area amorphous carbon (40 to 4000 A thickness), which is deposited directly over the porous metal or metal oxide layer on the porous support. The amorphous carbon is cross-linked between the planes accounts greater hardness and mechanical strength compared to graphitic structures which lack cross-linking of planes. Generally, planes of the carbon atoms are layered, irregular, and oriented relative to the surface of the conductive substrate.

C9) Amorphous carbon may be deposited onto a layer of metal or a metal oxide by any conventional method such as, for example, vacuum evaporation, plasma enhanced chemical vapor deposition, reactive sputtering, glow discharge, etc.

C10) Methods of coating the porous glass supports and other porous supports with metal or metal oxide coated glass, may be any conventional coating process such as, for example, vacuum evaporation, chemical vapor deposition, sol-gel deposition, spray pyrolysis, ion plating, sputtering, etc. Methods for depositing metal and metal oxide coatings on glass are given in Kirk-Othermer, "Concise Encyclopedia of Chemical Technology," John Wiley & Sons, Inc., 1985, pp 477-478, which is incorporated herein by reference in its entirety.

C11) Microporous and UF membranes made from inorganics or ceramics may also be used for electropolymerization if the top layer of the membrane is made conductive by well known methods that place on the surface metal or conductive metal oxides by conventional coating process such as, for example, vacuum evaporation, chemical vapor deposition, sol-gel deposition, spray pyrolysis, ion plating, sputtering. Or by the application of carbon or graphite by coatings from solution or amorphous carbon may be deposited onto a layer of metal or a metal oxide by any conventional method such as, for example, vacuum evaporation, plasma enhanced chemical vapor deposition, reactive sputtering, glow discharge. These microporous and UF membranes made from inorganics or ceramics are well known in the state of art and are made by typically forming a porous support $Al_2O_3$, carbon, SiC or a metal, made by sintering large particles of these materials. Each stage of the ceramic membrane composite is formed by sintering particles or by a sol-gel technique. The surface of these membranes may be further coated to reduce molecular weight cutoff and bring the membrane into the UF range. In effect this porous substrate is then coated with a thin layer of small particles of zirconia, alumina, or titania to form a microporous membrane. A third layer of still-finer particles or a colloidal dispersion is then applied to form a UF membrane. On these UF membranes a conductive layer may be coated as described above and this used to form the selective NF or RO membrane by electropolymerization.

C12) Carbon aerogels may be used alone or laminated as a thin film to a thicker porous polymer support for mechanical strength and asymmetry. Carbon aerogels are characterized by highly porous, monolithic, exhibiting low electrical resistivity (0.01-0.04 ohm*cm), high specific surface area (400-1200 $m^2/g$) can be laminated easily machined to a desired shape.

C13) graphite powder or balls also be used alone or laminated as a thin film to a thicker porous polymer support for mechanical strength and asymmetry.

D) Conductive Additives to Polymer Casting Solutions:

Non-limiting examples of conductive particles/materials which may be added to polymer casting solutions to form the conductive ultrafiltration or microporous supports.

D1) Carbon fibers of a diameter greater than 1 micron and variable lengths from 1 micron to millimeters may be used in this disclosure. The carbon fiber has a shape in which the diameter is large and a cylindrical mesh structure in parallel with its axis has not grown. In the gas-phase pyrolysis method using a catalyst, a tubular mesh structure is observed in parallel with the axis near the tube center with carbon of irregular structures adhering to the surrounding portions in many cases.

In addition powdered graphitic carbon fiber may be used.

D2) Carbon Nano-Tubes:

A material having a diameter of up to 1 micron smaller than that of carbon fiber, is known as a carbon nanotube in comparison to carbon fiber although there is no definite boundary between them. A carbon nanotube is a tubular structure whose diameter is 1 micron or less. An ideal structure of the carbon nanotube is a tube formed with a sheet of carbon hexagonal meshes arranged in parallel with its tube axis. A plurality of such tubes forms a nanotube. The carbon nanotube is expected to have characteristics like metals or semiconductors, depending upon both diameter of the carbon nanotube and the bonding form of the carbon hexagonal mesh sheet. In addition amorphous carbon surrounding a carbon nano-tube is also included within the category of carbon nano-tube. Generally, carbon nano-tubes are synthesized by the application of the arc discharge process, a laser evaporation process, a pyrolysis process and the use of plasma.

The carbon nanotube in the narrower definition is classified into one with a single hexagonal mesh tube called a single-walled nanotube, and one including a tube of a plurality of layers of hexagonal meshes called a multi-walled nanotube. Which of these types of carbon nanotube structures is available is determined to some extent by the method of synthesis and other conditions. It is however not as yet possible to produce carbon nano-tubes of the same structure.

D3) Activated carbons with large specific surface area, and low cost are one preferred additive. There are many activated carbons commercially available with high surface areas such as those in the range of 100 $m^2/gr$, 500 $m^2/gr$, 1000 $m^2/gr$, 1500 $m^2/gr$, 2000 $m^2/gr$, mesh sizes in the range of 50 to 400 and in the nano particle size range $m^2/g$, minimum size of 200 mesh, and 0% ash content.

D4) Other carbons that may be used are carbonaceous materials such as the Bucky ball, $C_{60}$ and carbon nanotube can also be used at low loading.

D5) Conductive metal oxides such as manganese oxide ($MnO_2$) and magnetite ($Fe_3O_4$).

E) Conditions of Electro-Polymerization on the Conductive Supports:

The following list is non-limiting: Water is one preferred solvent. Organic solvents alone and/or as an aqueous mixture may be chosen, but without limitation from: acetonitrile, propylene, carbonate, tetrahydrofuran, propionitrile, butyronitrile, phenylacetonitrile, dimethylformaide, dimethoxyethane, dimethylsulfoxide, pyridine, methylene chloride.

Electrolytes Present in the Electrolyte Solution for Vinyl Polymerization:

The following list is non-limiting: Sulfuric acid, perchloric acid, Anion-cation pairs, wherein the cation is selected from cations such as $Li^+$, $Na^+$, $K^+$, $Cs^+$, $Mg^{++}$, $(CH_3)_4 N^+$, $(C2H5)4 N^+$, $(C3H7)4 N^+$, $(C4H9)4 N.^+$, etc, and the anion is selected from anions such as $BF_4^-$, $C_{10}^-$, $I^-$, $Br.^-$, $NO_3^-$, $PF_6^-$, AsF6-, CF3 SO2-, SbF6-, HSO4-, and the like. The electrolyte may be used in the electrolyte solution at a concentration from about 0.01 to about 1.0 mole per liter.

E1) Methods and Materials of Electro-Polymerization-1

In operation, a conductive substrate and a counter-electrode are immersed in an electrolyte solution containing the monomers. The counter-electrode may be any suitable electrically conducting material such as, for example, graphite, platinum, nickel, gold, and the like. These may be in the form of a plate or a lattice positioned parallel to the conductive substrate. It is generally more difficult to achieve uniform coating on large areas than on small areas (<a few cm2) for many types of supports such as metal oxides when using monomers which require a high voltage for polymerization such as thiophenes. Larger surface areas may require excessively high electrical potentials, resulting in 1) degradation of the electrolyte solution, and 2) the incorporation of solvent and other impurity molecules into any resultant electrodeposited polymer. In addition at high electrical potentials, only higher oxidation potential electroactive polymers having poor uniformity and topography are formed. Interestingly, these same problems do not exist when electrodepositing higher oxidation potential polymers onto certain pure noble metal anodes. The interaction between unsaturated molecules and metallic surfaces of, for example, gold or platinum are well known in the art of catalysis and arise due to the interaction between pi and pi* molecular orbitals and the metal surfaces. Lower oxidation potential monomers, such as pyrrole and methylpyrrole however may be electropolymerized on all metal oxide supports to form uniform layers on large surface area under mild electrochemical conditions. The problem of non-uniform electro-deposition of high oxidation potential, low surface activity polymers may be solved by the incorporation of even trace amounts of lower oxidation potential monomers into the electro-polymerization cell electrolyte solution. Application of a lower electrical potential followed by a higher electrical potential, as set forth hereinabove, conveniently may be achieved by a constant-current electro-polymerization process, wherein the ratio of the lower oxidation potential to the higher oxidation potential radical cation produced would be dependent on the relative amounts of the two species and the required voltage needed to attain the set current density. At a low current density and moderate lower oxidation potential monomer concentration, the electrical potential reaches a limiting value of the lower oxidation potential, thereby causing the electro-deposition of a first layer of the lower oxidation potential polymer. As the lower oxidation potential monomer is depleted from the electrolyte solution in the region near the anode, the electrical potential rises to maintain the constant current density until reaching the higher oxidation potential at which time the higher oxidation potential monomer begins to electro-polymerize onto the first layer of the lower oxidation potential electroactive polymer.

The following methods and/or materials may be applied according to some embodiments:

Electropolymerization electrolyte solutions are prepared by admixing about 250 ml of acetonitrile, about 0.2 mole thiophene, about 0.1 mole lithium perchlorate, and differing amounts of pyrrole ranging from about 87 ul to about 1 ul corresponding to molar concentrations from about 0.005 M to about $5.77E10^{-5}$ M. Solutions containing even lower amounts of pyrrole are also prepared by dilution to achieve operable pyrrole concentrations as low as about $10^{-18}$ M.

Example of the electropolymerization of a two-layer polymer film is conducted in a solution containing about 10 ul pyrrole at a constant current of about 0.24 mA/cm$^2$, resulting in an initial electrochemical cell potential of about 1.2 volts (the oxidation potential of pyrrole). During this time, a layer of polypyrrole is deposited on an amorphous carbon and fluorine-doped tin oxide coated glass support. Thereafter, the electrochemical cell potential gradually increases to about 4.0 volts, at which time a uniform, dense, topographically planar layer of polythiophene (containing trace amounts of copolymerized polypyrrole) electropolymerizes over and adheres to the polypyrrole layer.

The delay in the rise of electrochemical cell potential, when electropolymerizing at a constant current, is directly proportional to the amount of pyrrole present in the solution and the current set point.

Solutions containing smaller amounts of added pyrrole reach the thiophene polymerization potential more quickly, but still result in uniform polythiophene film formation. At extremely low pyrrole concentrations, the 1.2 volt plateau is almost unobservable.

The characteristics of the two-layer electroactive polymer film are those of the dominant polymer, polythiophene.

F) Methods and Materials of Electro-Polymerization-2:

F1) Methyl methacrylate and glycidyl acrylates can be electropolymerized on a cathodic electrode from aqueous based solutions to form a uniform, thin, passive films of poly(Me methacrylate) and poly(glycidyl acrylate). Though this was shown on stainless steel electrodes (Cram, S. L.; Spinks, G. M.; Wallace, G. G.; Brown, H. R. Journal of Applied Polymer Science (2003), 87(5), 765-773.) It may be also used on porous conductive membranes which are used as the cathodic electrode. The electropolymerized films were dependent on the electrolysis time and potential and were also influenced by the individual monomer properties. The approach described in this reference is incorporated within the disclosure.

F2) Poly(3-methylthiophene) (PMT) films of varying thickness, were electrochem. deposited on a flat stainless steel electrode surface by direct oxidn. of 3-methylthiophene in BF3.Et2O at 1.38 V Radical cations and dications coexist on the backbone of PMT as conductive species and their concentrations increase with increasing doping level. Successive cyclic voltammetry proved to be an effective approach to improving the doping level of as-grown thin compact PMT films. Reference: Xu, Jing-Kun; Shi, Gao-Quan; Chen, Feng-En; Hong, Xiao-Yin. Chinese Journal of Polymer Science (2002), 20(5), 425-430. The approach to electropolymerization and materials described in this reference is incorporated within the disclosure for use on porous conductive supports to make RO and NF membranes.

F3) Electrooxidative polymn. of 2,5-dimethoxyaniline was carried out using 304 steel electrodes under potential cycling conditions in 1M phosphoric acid electrolyte. Thin poly(2,5-dimethoxyaniline) (PDMA) films were obtained on the electrode surface. The FTIR spectra of the films indicate that the structure of PDMA is the same as that observed for PDMA prepared on Pt and glassy carbon electrodes. The PDMA films are electroactive between −0.2 and 0.7 V vs. Ag/AgCl and are electrochromic. More information may be found in Ortiz, Reynaldo; Hernandez, Yovelis; Weinhold, Elkis; Marquez, Olga P.; Marquez, Jairo. Revista Tecnica de la Facultad de Ingenieria, Universidad del Zulia (2001), 24(3), 217-223, which is incorporated herein by reference in its entirety. The approach to electropolymerization and materials described in this reference is incorporated within the disclosure for use on porous conductive supports to make RO and NF membranes.

F4) Electropolymerization to non conducting films-Poly (o-anisidine) thin films can be prepared by electropolymerization of o-anisidine on SnO2:F coated glass substrates under cyclic voltammetic conditions. Cyclic voltammetry investigations indicate the loss of electro-activity of the films of pH values above 2.22. The optical absorption spectroscopy study reveals the predominant formation of insulating pernigraniline base (PB) at higher pH values while at lower pH values exclusive formation of the emeraldine salt (ES) phase is observed The morpholology of the films is found to strongly depend on the pH of the electrolyte. More information may be found in Patil, Sharmila; Mahajan, J. R.; More, M. A.; Patil, P. P. Journal of Polymer Materials (2001), 18(4), 433-440, which is incorporated herein by reference in its entirety. The effect of temperature on electropolymerization of anisidine has also been studied: The POA films were synthesized electrochem. under cyclic voltammetric conditions in aq. solns. of H2SO4 at various temps. between −6° C. and 40° C. These films were characterized by cyclic voltammetry (CV), UV-visible spectroscopy and SEM. The rate of polymer formation depends on the synthesis temperature and is highest at 15° C. The POA film synthesized at 15° C. shows predominant formation of the emeraldine salt phase of POA. The surface morphol. as revealed by SEM, is observed to depend on the synthesis temperature, and is caused by different rates of polymer formation at different temperatures. The approach to electropolymerization and materials described in these reference is incorporated within the disclosure for use on porous conductive supports to make RO and NF membranes. In the preferred use the formation of non conductive films is preferred because of their high oxidant stability.

F5) Conductive films—Carbazole has been electropolymerized to polycarbazole (PCZ) thin films on SnO2 coated glass substrates. The films obtained with LiClO4 as electrolyte are homogeneous and their coverage efficiency on the SnO2 underlayer is very high. Films are exempt of pinholes, cracks and other morphologies. defaults as shown by SEM. Cyclic voltammograms are reversible, attesting the high quality of the structural properties of the films. More information may be found in Yapi Abe, S.; Bemede, J. C.; Delvalle, M. A.; Tregouet, Y.; Ragot, F.; Diaz, F. R.; Lefrant, S. Synthetic Metals (2002), 126(1), 1-6 and Taoudi, H.; Bernede, J. C.; Del Valle, M. A.; Bonnet, A.; Molinie, P.; Morsli, M.; Diaz, F.; Tregouet, Y.; Bareau, A Journal of Applied Polymer Science (2000), 75(13), 1561-1568, which is incorporated herein by reference in its entirety. The approach to electropolymerization and materials described in these references is incorporated within the disclosure for use on porous conductive supports to make RO and NF membranes.

F-6) Conductive films—Substituted heterocyclic monomers may include a heterocyclic compd. having a substituent group which has an amine, ester, hydroxyl, and protected hydroxyl functionalities, and the substituent group includes, at least, in the absence of amine functionality, a $C_4$ hydrocarbon chain and disposed between the heterocyclic nucleus and the functionality. The monomers may be subjected to electrochemical polymerization to produce heterocyclic polymer films with good conductivity Thus, Me 3-amino-3-(3-thienyl)-2-butenoate (I) was prepared from 3-thienylacetonitrile in 74.1% yield, m.p. 69C, and oxidation potential 1.7 V/SCE. Electrochemical polymerization of I gave a thin golden polymeric film having oxidation potential 0.8 V/SCE, indicative of good conductivity More information may be found in Lax, David Julian; Singh, Gurdial. (NMC (UK) Ltd., UK). Brit. UK Pat. Appl. (1996), which is incorporated herein by reference in its entirety. The approach to electropolymerization and materials described in this reference is incorporated within the disclosure for use on porous conductive supports to make RO and NF membranes.

F7) Nonconductive polymers—Elelctropolymerization, which gives thin films with satisfactory properties, mixtures of monomers (preferably forming nonconductive polymers), materials associating with the polymer, supporting electrolytes, and solvents are subjected to electrolysis using the substrate as cathode. Subjecting a solution of 30 mL MeCN, 0.2 mL acrylonitrile, 1.75 g perdeuterostyrene, and 0.35 g Et4N+ClO4- to electrolysis on a Ni cathode at a final voltage of −2 V gave a film containing 2H. More information may be found in Mertens, Marc; Calberg, Cedric; Martinot, Lucien; Jerome, Robert; Schrijnemackers, Jean. Eur. Pat. Appl. (1995), 17 pp EP 665275 A1 19950802 which are incorporated herein by reference in their entirety. The approach to electropolymerization and materials described in this reference is incorporated within the disclosure for use on porous conductive supports to make RO and NF membranes.

F-8) Conductive films (polypyrrole) —Manufacture of organic polymer thin films by electrochemical polymerization. The title films are formed at the interface between an electrolyte solution. of electrochemical polymerizable organic compounds and a dielectric liquid not miscible with the electrolyte solution. A gold foil anode was placed at the interface between heptane and an aq. CuSO4 solution containing pyrrole, and a Cu cathode was used. As polypyrrole film was deposited on the foil, the foil was wound up together with the film, so that a continuous film could be formed. Reference: Kaneko, Hiroyuki; Yasumatsu, Hitoshi. Jpn. Kokai Tokkyo Koho (1994). The approach to electropolymerization and materials described in this reference is incorporated within the disclosure for use on porous conductive supports to make RO and NF membranes.

F9) Preparation of insulating thin film by electrochemical polymerization—Pyrrole is electrochemical polymerization with 1,4-bis(2-methylstyryl)benzene (I); the electrochemical oxidation current is suppressed with time by I. The thickness and electrical conductivity of the film are 0.1 microns and 7×10-14 S-cm−1, respectively. More information may be found in Kawai, Tsuyoshi; Kuwabara, Takao; Yoshino, Katsumi. Technology Reports of the Osaka University (1991), 41(2053-2075), 319-23 which is incorporated herein by reference in its entirety. The approach to electropolymerization and materials described in this reference is incorporated within the disclosure for use on porous conductive supports to make RO and NF membranes. Especially those aspects used in achieving non conductive films.

F10) Preparation of insulating thin film by electrochemical polymerization—Preparation of Insulating Thin Films by Electrochemical Polymerization of 1,4-bis(2-methylstyryl) benzene (I) was investigated. The electrochemical oxidation current of I was suppressed as time lapse. The thickness and the conductivity of the electrochemically prepared film obtained from 1 were as low as 0.1 microns and 7×10-14 S cm−1, respectively. An MIM capacitor with the pinhole-free polymer film as a dielec. layer was also investigated. More information may be found in Kawai, Tsuyoshi; Kuwabara, Takao; Yoshino, Katsumi. Eng. Coll., Osaka Univ., Osaka, Japan. Technology Reports of the Osaka University (1991), 41, 319-23, which is incorporated herein by reference in its entirety. The approach to electropolymerization and materials described in this reference is incorporated within the disclosure for use on porous conductive supports to make RO and NF membranes.

F11) Non-conducting polyphenylene films: Conducting Carbon film from nonconducting polyphenylene prepared by electrochemical polymerization. A C film was produced from polyphenylene (PP) film prepared. by electrochemical. polymerization. of PhH to obtain a uniform and thin film. The PP film (.apprx. 10 micron thick) was transformed into the C or graphite film without drastic changes of shape or size. The electrical conductivity of the film was remarkably enhanced by heat treatment at 600-800 C, but further increase in the conductivity was not observed with treatment at higher temps. This behavior is considered to correlate with a poor degree of graphitization of the PP film. The carbonization and graphitization mechanisms of the film are discussed in connection with the structure of PP in the film. Reference: Yamada, Yoshio; Furuta, Takeshi; Shiraishi, Minoru; Sato, Masaaki; Kaeriyama, Kyoji Journal of Materials Science (1989), 24(9), 3113-17, which is incorporated herein by reference in its entirety. The approach to electropolymerization and materials described in this reference is incorporated within the disclosure for use on porous conductive supports to make RO and NF membranes—especially those aspects of forming the PP film with the insulating properties. Subsequent carbonization as described in this reference is not incorporated into the present disclosure.

F12) Ordered thin films of polyheterocycles electrochemical polymerization and Langmuir-Blodgett film formation. The electrochemical. growth processes of thin films of polyheterocycles complexes with a variety of anions have been the subject of several studies. The electrochemical. growth technique affords many degrees of freedom to influence the growth process, which can lean to materials with widely varying electrical optical and structural properties. Ordering of electrochemical. grown thin films was studied with near edge x-ray fine structure (NEXAFS) techniques using synchrotron radiation and also with grazing incidence FTIR spectroscopy. Recent results with Langmuir-Blodgett films of 3-hexadecylpyrrole was reported. Reference: Skotheim, T. A.; Yang, X. Q.; Inagaki, T.; Samuelsen, L.; Tripathy, S. Dep. Chem., Lowell Univ., MA, USA. Avail. NTIS. Report (1988), The approach to electropolymerization and materials described in this reference is incorporated within the disclosure for use on porous conductive supports to make RO and NF membranes.

F13) Electrochemical polymerization of dithienylbenzene and dithienylpyridine.

1,4-Bis(2-thienyl)benzene (I), 2,5-bis(2-thienyl)pyridine (II), and 2,6-bis(2-thienyl) pyridine (III) were electrochemical. polymerization. The electrical. conductivities were 1.7×

10-1, 2.6×10-8, and 1.2×10-7 S/cm, respectively. A III film had a very even surface and was composed of fibrils growing on a thin, dense layer. IR spectra showed the monomer units to be linked through the 5,5'-positions of the thiophene rings. Reference: Tanaka, Susumu; Sato, Masaaki; Kaeriyama, Kyoji. Res. Inst. Polym. Text., Tsukuba, Japan Journal of Macromolecular Science, Chemistry (1987), A24(7), 749-61, which is incorporated herein by reference in its entirety. The approach to electropolymerization and materials described in this reference is incorporated within the disclosure for use on porous conductive supports to make RO and NF membranes.

F14) Non-conducting layers—Electrochemical polymerization in Langmuir-Blodgett film of new amphiphilic pyrrole derivatives. Electrochemical polymerization in Langmuir-Blodgett multilayers of amphiphilic pyrrole derivatives resulted in anisotropic-conducting thin films having alternate conducting and insulating layered structure. Reference: Iyoda, T.; Ando, M.; Kaneko, T.; Ohtani, A.; Shimidzu, T.; Honda, K. Grad. Sch. Eng., Kyoto Univ., Kyoto, Japan. Tetrahedron Letters (1986), 27(46), 5633-6, which is incorporated herein by reference in its entirety. The approach to electropolymerization and materials described in this reference is incorporated within the disclosure for use on porous conductive supports to make RO and NF membranes.

F15) Electrochemical polymerization of pyrrole on carbon fiber surfaces—The electropolymerization of pyrrole (0.1 M) in Et4NBF4-LiClO4 electrolyte (0.1 M) and in acetonitrile or in THF on carbon fiber surface (anode) produced thin polypyrrole (I) [30604-81-0] films of 0.1 or 0.5 micron thickness after 15 s or 10-15 min of voltage application, resp. After 30-40 min voltage application I coating consisted of an irregular deposit lumps (5 micron thickness) over the continuous film. I was strongly adhered to the fiber surface and the coated fiber had higher rupture load and tensile strength and elongation at break than those of uncoated fiber. The elemental composition. and electronic structure (XPS) of I were comparable to those of I deposited on Au. Reference. Lazzaroni, R.; Dujardin, S.; Riga, J.; Verbist, J. J. Lab. Spectrosc. Electron., Fac. Univ. Notre-Dame de la Paix, Namur, Belg. Surface and Interface Analysis (1985), 7(5), 252-4, which is incorporated herein by reference in its entirety. The approach to electropolymerization and materials described in this reference is incorporated within the disclosure for use on porous conductive supports to make RO and NF membranes.

F16) Polyphenylene oxide films which may be nonconductive—Their functionalization may help membrane properties—Producing thin films of "reactive polymers" on metal surfaces by electrochemical polymerization. Part III. Amino-substituted poly(phenylene oxide) films.

Polyphenylene oxide films bearing reactive amino functions are obtained by the selective electrochemical oxidation of phenol derivatives substituted by amino or anilino groups. The characteristics and elaboration of these films are described in the case of tyramine [51-67-2] and N-(o-hydroxybenzyl)aniline [3526-45-2]. The films obtained, whose thickness is between 50 and 100 nm, display a very good surface homogeneity and a very strong adherence to the metal surface (Pt, Fe, Cu, etc.). In the case of polytyramine [71495-67-5], the reactivity of polymer films is used to graft ferrocene entities through condensation of the amino group of polytyramine with the aldehyde groups of ferrocenecarboxaldehyde [12093-10-6]. Reference. Dubois, Jacques Emile; Lacaze, Pierre Camille; Pham, Minh Chau. Journal of Electroanalytical Chemistry and Interfacial Electrochemistry (1981), 117(2), 233-41, which is incorporated herein by reference in its entirety. The approach to electropolymerization and materials described in this reference is incorporated within the disclosure for use on porous conductive supports to make RO and NF membranes.

F17) Obtaining thin films of "reactive polymers" on metal surfaces by electrochemical polymerization. Alcohol substituted polyphenylene oxide films.

The selective electrochem. oxidn. of methylol-substituted phenols leads to reactive methylol-substituted polyphenylene oxide films on metals. The quantitative reaction of the methylol group of the polymer coating was used to indicate the reactivity. The average film thickness is approximately 50-100 nm; however, with a ferrocene-ferrocinium redox catalyst, the thickness can reach approximately 300 nm. This mechanism operates only when the catalyst oxidation. potential is similar to that of the phenol derivatives. Reference. Pham, Minh-Chau; Dubois, Jacques Emile; Lacaze, Pierre Camille, Journal of Electroanalytical Chemistry and Interfacial Electrochemistry (1979), 99(3), 331-40, which is incorporated herein by reference in its entirety. The approach to electropolymerization and materials described in this reference is incorporated within the disclosure for use on porous conductive supports to make RO and NF membranes.

F18) Obtaining thin films of "reactive polymers" on metal surfaces by electrochemical polymerization. Part I. Reactivity of functional groups in a carbonyl substituted poly(phenylene oxide) film.

Polyphenylene oxides containing. CO groups were prepd. by electrodeposition onto metals to give coatings with reactive groups which are chem. alterable, for example by treatment with 2,4-dinitrophenylhydrazone (I) to replace a part of the CO groups with C:NNHPh groups. The polyphenylene oxides were deposited onto Fe, Cu, Pt, and Ni electrodes, and instrumental analytical. showed that oxidative condensation was selective to the phenol-type moiety. The thin films deposited showed no discontinuity over the entire surfaces, and were adherent as shown by the Scotch tape pull test. The I treated films had better heat resistance than untreated ones. Reference. Pham Minh Chau; Lacaze, Pierre Camille; Dubois, Jacques Emile. Journal of Electroanalytical Chemistry and Interfacial Electrochemistry (1978), 86(1), 147-57, which is incorporated herein by reference in its entirety. The approach to electropolymerization and materials described in this reference is incorporated within the disclosure for use on porous conductive supports to make RO and NF membranes F19) Insulators-low conductivity—Electrochemical polymerization of aromatic amines. Films resulting from the anodic oxididation. of aromatic amines RC6H4NH2 (R=H, p-Me, p-MeO, o-F3C, m-F3C, p-HO2C, o-H2N, p-H2N) were grafted on Pt electrodes in a MeCN—NaClO4-pyridine medium. An in-situ polaromicrotribometric (PMT) study of changes occurring on the electrode surface during polarization indicates that these deposits have a stable friction coefficient of 1.30 f0. Analytical by multiple-reflection IR spectroscopy and by XPS show that the films are organic polymers of emeraldine basic structure and probably result from coupling of electrochemical formed anilino radicals with the monomer. These films are homogeneous, very adherent, thermally stable, and free of ionic impurities. In the dry state they display a conductivity of 5×10-13 S-1 cm-1, which is characteristic of insulators. Reference Volkov, Anatole; Tourillon, Gerard; Lacaze, Pierre Camille; Dubois, Jacques Emile. Journal of Electroanalytical Chemistry and Interfacial Electrochemistry (1980), 115(2), 279-91, which is incorporated herein by reference in its entirety. The approach to electropolymerization and materials described in this reference is incorporated within the disclosure for use on porous conductive supports to make RO and NF membranes.

F20). The electropolymerization of crown ethers on porous support for ion extraction has been disclosed in U.S. Pat. No. 5,200,041, which is incorporated herein by reference in its entirety. The disclosure relates to a composite element of an electrically conducting polyaromatic structure, such as graphite, covered with a polymer or copolymer of a crown-ether or macrocyclic ligands such as dibenzoethers which had been electrochemically polymerized into the polymer. Among the macrocyclic ligands, a great deal of research has been carried out on crown ethers and it has recently been discovered that it was possible to polymerize crown ethers electrochemically and as described by V. de Barre in J. Electroanal. Chem., 206, 115, 1986, J. Electroanal. Chem., 240, 117, 1988 and Nouveau Journal de Chimie, vol. 9, No. 6-1985, pp 419 to 426, which is incorporated herein by reference in its entirety. In this composite element, the use of a support having a polyaromatic structure makes it possible to obtain an improved adhesion between the crown dibenzoether polymer or copolymer and the support. Moreover, with such supports, there is an increase in the performance characteristics of the electrodeposited polymer, because the latter has a much larger specific surface than with metallic supports, which permits an easier access of the reagents in the active sites of the composite element. Finally, the supports are advantageous because they are generally much else onerous than supports made from platinum or non-corrodable precious metals such as are used at present. The use of a polymer formed from a "crescent" dibenzoether (II) makes it possible to modify or avoid the geometrical limitations which may occur during the complexing of metal ions, as is the case for polymers having a cyclic cavity in accordance with formula (I). In these composite elements incorporating a polymeric layer of compound (II), the support can either be of non-corrodable metal, or of an electricity conducting, organic or inorganic polyaromatic structure product. In this second embodiment, the use of monomers of type (II) makes it possible to use metal supports, because there is no adhesion problem as occurs with monomers of type (I).

The metals or metallized anodic supports used are non-oxidizable metals with a potential of +1V compared with a 0.1M Ag/Ag$^+$ electrode. Examples of such metals are gold, platinum, rhodium and all precious metals.

As in the case of polymers formed from crown ethers of formula (I), it is more interesting (cost, larger specific surface area, better adhesion of the resin to the support) to use a support having an electrically conducting, polyaromatic structure. These polyaromatic structure support materials can be of the inorganic type, such as graphites, or of the organic type, such as conductive polymers, for example polyanilines, polythiophenes and polypyrroles. Vitrified carbon, which does not have this polyaromatic structure, is not suitable in the present disclosure. The supports used can have a specific surface of 0.01 to 20 m$^2$/g. The supports used can be continuous, for example can be in the form of plates, grids, fibres, felts or fabrics. In particular graphite fibres, felts and fabrics are used. However, the continuous supports according to the disclosure may only have a specific surface of approximately 1 m$^2$/g or less, whilst still permitting the deposition of a polymer with a satisfactory quality.

The supports used can also have a composite structure, for example can be formed by naturally oxidizable metals covered with a continuous layer of a non-oxidizable metal, or a continuous layer of an electricity conducting, polyaromatic structure product. This is also applicable to both continuous and discontinuous supports.

In the composite element according to the disclosure the dibenzoether copolymers of formulas (I) and (II) can be of different types. Thus, they can be copolymers of dibenzoethers of formulas (I) and (II) with other identical monomers. It is also possible to use copolymers of a dibenzoether of formula (I) and a dibenzoether of formula (II).

The composite elements according to the disclosure are prepared by polymerizing by electrochemical oxidation, the mixtures of corresponding monomers of formulas (I) and/or (II) on an anode incorporating a metal support or an electricity conducting, polyaromatic structure product.

When starting with two different phenols, the different products obtained are then separated by conventional methods in order to isolate the sought product For the polymerization of monomers (I) or (II), use is made of an electrolytic cell in which the anode forms the support for the composite element. The cathode can be made from various electricity conducting materials, for example vitreous carbon or platinum. The monomer of formula (I) and/or formula (II) are introduced into the electrolytic cell dissolved in an appropriate solvent incorporating a support electrolyte. The solvents used are organic solvents, which must be substantially free from water, because electropolymerization has to be carried out in a medium avoiding the nucleophilic character of the water. The solvents must also not be oxidized at the voltage used for dibenzoether electropolymerization.

Examples of organic solvents which can be used are acetonitrile, methylene chloride and aprotic solvents such as nitromethane, nitrobenzene, propionitrile and 1,3-dioxolan. It is also possible to use mixtures of these solvents. The solvent is generally constituted by a mixture of methylene chloride and acetonitrile.

It is also possible to use pure acetonitrile, but this leads to a compact deposit, which is less thick and less conductive. The support electrolytes are salts, in particular quaternary ammonium or alkali metal salts. The anion of the salt must be less oxidizable than the dibenzoether of formula (I) or (II). Examples of salts which can be sued are tetraalkyl ammonium, hexafluoroarsenates, hexafluorophosphates, perchlorates and tetrafluoborates, for example tetramethyl, tetraethyl, tetrapropyl, tetrabutyl or tetrapentyl ammonium.

As in the case of the solvent, it is vital that the electrolyte is also free from water. The electrolyte and the solvent are subject to conventional purification and drying methods. Thus, when using acetonitrile, the latter is stored on an activated molecular screen or sieve and is distilled on phosphoric anhydride just prior to use. In the case of methylene chloride, the latter is stored under the same conditions, but is distilled on calcium hydride.

In order to carry out polymerization, to the anode is applied a potential higher than 1V compared with a 0.1M Ag/Ag.$^+$ reference electrode in order to oxidize the dibenzoether according to the following reaction: M . . . M'$^+$4H, with M representing the starting monomer and M' the oxidized monomer. Thus, 4 protons per monomer are stoichiometrically extracted.

Membrane Configurations:

The membranes of this disclosure may have the following configurations; the membrane may be formed as a Flat sheet, hollow fiber, or tubular membrane and then wound into a spiral wound element, or placed in a hollow fiber or tubular or plate and frame element. Alternative it may be formed when it is already in spiral wound element configuration, or after placed in a hollow fiber or tubular or plate and frame element Additional Details of the Disclosure Membranes may be made from other monomers such as which form non-conductive polymers from phenol or phenol derivatives and from conductive polymers as from aniline, pyrrole, thiophene and ethylene dioxythiophene—EDOT.

In the electropolymerization of the selective film on the conductive UF supports—the electropolymerization (EP) can be carried out in the following non-limiting ways using a Gamry potentiostat in three different modes: cyclic voltammetry (linear sweep of the electrode potential between two values), chronoamperometry (potentiostatic regime) and chronopotentiometry (galvanostatic regime). From an industrial point of view, galvanostatic deposition at high current density is most often used in electrochemical deposition processes [J.-L. Camalet, J. Electroanalytical Chemistry., 485 (2000) 13-20], and, therefore, is one preferred operational mode. Since it was found in the preliminary experiments that the electrochemical process itself, even when performed on the supporting electrolyte alone without the monomer, can alter the water flux through the membrane, all the membranes were subjected to 15 min, 50 mA chronopotentiometry in 0.5M sulfuric acid solution prior to initial flux evaluation (before the EP). The membranes were subsequently tested for water flux and rejection of sucrose (using 3% feed solution) and magnesium sulfate (using 0.01M solution).

The difference of conductive polymers like polyaniline (PANI) over the non-conductive polyphenols is their ability to continue polymerization grow unlimitedly and, therefore, forming a thicker film having, in principle, higher rejection abilities. The pH values below 4 are required to keep the PANI film in protonated form, which provides the film with electronic conductivity. Therefore, a solution of sulfuric acid or p-toluenesulfonic acid (TSA) were used as a supporting electrolyte. The use of TSA was based on it being included into the growing PANI film, thus increasing its conductivity, which promotes formation of a thicker and more cohesive film with a higher anion rejection in the RO tests.

The effect of addition of sodium dodecyl sulfate (SDS) to the solution was tested since it was reported to increase the rate of electrooxidation of aniline [10]. It was also reported [J.-L. Camalet, J. Electroanalytical Chemistry., 485 (2000) 13-20] that a certain current density window exists for optimal EP of aniline. Too low current density requires longer EP times and too high current density produces a PANI film of poor quality (overoxidized). Therefore, a nearly optimal current density (50 mA/13.2 cm$^2$=3.79 mA/cm$^2$) was found experimentally.

Experimental Procedures for Example 1:

Electrochemical experiments were carried out using a PCI4 Potentiostat/Galvanostat/ZRA manufactured by Gamry Instruments, Inc. The electrochemical cell was a cylinder having inner diameter 4.1 cm made of poly(methacrylate). The working electrode was a circular piece of the conductive UF support that formed the bottom of the cell sealed with a rubber O-ring. The diameter of the piece of the UF support was somewhat larger than that of the O-ring, thereby the outer edges of the UF support protruding beyond the O-ring remained dry and could be used for electric connection to the potentiostat. The connection was achieved by means of a concentric stainless steel ring located outside the cell and tightly pressed against the outer edge of the UF support. The counter electrode was a circular piece of platinum mesh having a diameter slightly smaller than the inner diameter of the cylindrical cell. It was placed inside the cell 1 cm above the surface of the UF support and was completely covered by the solution during the electrochemical procedures. The total UF support area exposed to the electrochemical treatment was 13.2 cm$^2$. The shape of the piece of UF support allowed its easy transfer to stirred pressure cells for testing its RO/NF performance (see next).

Membrane Testing

The membranes were tested in stirred pressure cells made of stainless steel. The cells were pressurized with nitrogen from a gas cylinder. The test solutes were dextrane (3%), sucrose (3%) and MgSO$_4$ (0.01 M). Dextrane and sucrose rejection was measured either by OPTECH portable refractometer (range 0-10%, resolution 0.1%) for coarse evaluation, in addition, sucrose rejection was measured more accurately by TOC analysis. Magnesium sulfate rejection was measured by conductivity using an InoLab Cond Level 1 conductivity meter.

Example 1

An NF membrane was formed in the following way. A conductive support is first made using the following composition of a casting solution. PSu-3500 (13.8%), PS-block-PB (0.2%), Vulcan P (16%), and NMP 70%. The mixtures were prepared at 90° C. and intensive stirring, cast with 400 micron knife and subjected to solvent evaporation by placing in an oven at 110° C. for 5 min prior to phase inversion. Deposition by electropolymerization of a thin selective polyaniline was the carried out by Chronopotentiometry at 50 mA, for 30 min in a solution of 0.05M Aniline in 0.5M Sulfuric Acid at 3.79 mA/cm$^2$ showed 89.8% rejection for MgSO$_4$, 95.9% rejection for sucrose and water flux of 4.47 Lmh/bar. The procedure could be further optimized with respect to acid concentration, current density and other parameters.

Example 2

The UF membrane is made as described in example 1 above. The conductive UF support is then placed in an electrolytic cell as the anode with a gold counter electrode. A constant voltage electrolysis (35-100V for 60 min) of aqueous solutions containing 0.1 M phenol 0.01 M NaOH. Despite the high voltage and the highly conductive electrolyte, initial current densities are low "mA cm$^{-2}$, and during polymer deposition, the current was reduced to out one-third of the initial value, indicating a coating an insulating film.

When checked at 10 bars in a pressure cell the membrane had the properties of an NF membranes with sucrose rejections above 60%

The coating thickness increased with increasing voltage giving a membrane with decreased flux.

The coatings formed by potentiostatic electrolysis at +0.85 and +1.25V (SHE) are thick and highly cracked when excess NaOH was used, but thin and continuous when phenol was at equimolar with NaOH.

Example 3

Example 2 was repeated carrying out the electropolymerization in an alkaline alcoholic solutions.—Methanol The coatings obtained from 2,6-dimethyloxyphenylene on the support electrodes are adherent, insulating and hydrophobic. 3-5-Dimethylphenol was also polymerized, giving however a different polymer with respect to that produced from the 2,6-isomer. In addition ester- and amido substituted phenols were also polymerized in NaOH methanol.\ mixtures. The results show that the methanol-NaOH electrolyte allows the synthesis of well-characterized coatings which, which are adherent and homogeneous but thinner (1 micron or less) than that found in alkaline solutions. All these membranes had NF selectivities with sodium chloride rejections less than 80% and sucrose rejections greater than 80%. They all demonstrated chlorine stability after immersion in 20 ppm hypochlorite at pH 6-7 for two weeks.

Example 4

Example 2 is repeated but in this example by electrolyzing a water-methanol (30%) solution containing 1.2M phenol, 0.7M allylamine, and 0.15M methoxyethanol with applied voltages in the range 2.5-4.5V a smooth current decrease was observed while a thick polymer coating formed. At higher voltages, however, fast passivation took place and porous support becomes coated with a thinner films (0.5-2 microns). This fall in performance did not occur when the selected monomer was 2-allylphenol. Thus, when hydro-alcoholic allylamine-2-allylphenol solutions where used a fast coating operations occurred yielding thick films. These membranes had a flux of 1500 liters/meter2/day at 15 bars for a 1000 ppm NaCl solution and a rejection of 90%. They also demonstrated chlorine stability according to the tests of Example 3.

Example 5

Example 2 is repeated in acidic solutions. —Using an oxalic acid medium cyclic voltammetry of 0.19M phenol in 0.24M oxalic acid +0.12M ammonium oxalate hydro-alcoholic solution (pH=2.5) was applied. Phenol oxidation polymerization led to passivation by the forming insulating polymer films. Elelctropolymerization under acidic pH (2.5) can also occur. For example polymerization of a two-layer coatings were formed by anodizing the porous electrode in oxalic acid-phenol mixtures, the underlying oxalate layer being stabilized by the polyoxyphenol formed on top of it. The polymer layer, which became hydrophobic by thermal curing, made these coatings even more stable. The maximum attainable thickness of the polymer layer was found to increase with monomer concentration, in agreement with the behavior observed in basic solutions, being about 1 micron for 0.19 M phenol concentration and rising to 10 microns when phenol is more concentrated than 0.5M. After curing the membranes demonstrated RO rejections to 1000 ppm of greater than 90%, while before curing the membranes demonstrated rejections of NF membrane with less than 80% NaCl rejections with more than 80% sucrose rejections.

Example 6

A membrane as in example 2 was repeated using instead of Black pearl 2000 a carbon black powder from Norit with an internal surface area of 1000 m2/gr and with a submicron particle size, a polysulfone 3500 from Solvay instead of the polyethersulfone gave a oxidant stable NF membrane that when testing with 1000 ppm NaCl the rejection was 65% and the Lp 5 L/m2 hr-bar. Checking the membrane with glucose (5%), MgSO4 (2000 ppm), Na2SO4 (1000 ppm) and CaCl2 (500 ppm) gave rejections of 90%, 95%, 85%, 69% respectively at 15 bars. After immersion in a 100 ppm hypochlorite solution at pH 6 for 200 hrs the membrane was retested and showed similar performance indicating chlorine and oxidant NF stability.

Example 7

The UF membrane of Example 2 is repeated using a black pearl having an internal surface area of 700 m2/gr, submicron particle size and in a concentration 1.5 times greater. The conductive UF membrane in an electrolysis cell with a counter electrode of gold foil is located in the cell containing a solution of 0.3M tetra-n-butyl ammonium perchlorate as the electrolyte in N,N-dimethylformamide and monomers. The monomer/electrolyte slurry thus contains N,N-dimethylformamide with monomer total monomer concentration 3.4M in a ratio of about 50 percent divinylbenzene and 5 percent ethylvinylbenzene and 45% styrene sulfonic acid. Oxygen is removed from the polymerization solution by sparging with prepurified nitrogen gas for about 15 minutes. After correction of the necessary voltage for the internal resistance of the polymerization solution and electrolyte, by conventional iR compensation techniques, polymerization is initiated by applying an electrical potential to the working electrode over the range starting from 0.00V then proceeding continuously to −2.75V then returning to 0.00V at a scan rate of 200 mV/second using a potentiostat. The measured electric potentials are with respect to the silver quasi-reference electrode. The supported membrane-working electrode is removed from the electrolyte-polymerization solution after one complete voltage cycle. The membrane was then removed and stored in 500 ppm NaCl solution overnight. When checked at 10 bars in a pressure cell the membrane had a Lp of 5 to 7 L/m2 hr-bar to pure water. Testing with 1000 ppm NaCl the rejection was 20% and the Lp 3 L/m2 hr-bar. Checking the membrane with glucose (5%), MgSO4 (2000 ppm), Na2SO4 (1000 ppm) and CaCl2 (500 ppm) gave rejections of 62%, 99% 54% 95% respectively at 15 bars. After immersion in a 100 ppm hypochlorite solution at pH 6 for 200 hrs the membrane was retested and showed similar performance indicating chlorine and oxidant NF stability.

Example 8

Example 2 is repeated with monomer total monomer concentration 2.7M in a ratio of about 60 percent divinylbenzene and 15 percent ethylvinylbenzene and 25% styrene sulfonic acid. The resulting membrane was an RO membrane with 90+% rejection to 100 ppm NaCl and a flux of 1 liter/meter2/hour/bar.

Example 9

When Example 7 is repeated using a porous membrane of porous alumina having a pore diameter of 0.2 .mu.m from Anotec Separations Limited, Banbury, Oxfordshire OX16 7JU, United Kingdom). The alumina membrane is rendered conductive by coating the porous alumina substrate with a layer of gold. A deposit of 500 angstrom of gold is applied to the alumina support using a Techniques Hummer argon plasma depositor. The resulting membrane had NF selectivity with a sodium sulfate rejection of 84% and a sucrose rejection of 85% and a NaCl rejection of 39%.

What we claim is:
1. A composite membrane comprising:
   (i) an electronically conductive porous support having asymmetric porosity comprising a mixture of non-conductive organic polymer and a conductive component selected from the group consisting of conductive particles and conductive polymer; and
   (ii) an electro-polymerized selective layer.
2. The membrane of claim 1, wherein said support is an ultrafiltration membrane.
3. The membrane of claim 1, wherein said conductive particles comprises metal(s), conductive nitride(s), conductive oxide(s), conductive carbide(s) or any combination thereof.
4. The membrane of claim 1, wherein said conductive polymer is a conductive redox polymer mixed in a compatible blend or a non-compatible blend, wherein the concentration of said conductive redox polymer is above the percolation point needed to achieve electronic conductivity.

5. The membrane of claim 1, wherein the electro-polymerized selective layer comprises an electro-polymerizable monomer units.

6. The membrane of claim 5, wherein the electro-polymerizable monomer units are polymerized into a conductive polymer.

7. The membrane of claim 6, wherein the electro-polymerizable monomer units comprise pyrrole, thiophene, aniline, carbazole, azulene, furan, derivatives thereof or any combination thereof.

8. The membrane of claim 5, wherein the electro-polymerizable monomer units are polymerized into a non-conductive polymer.

9. The membrane of claim 8, wherein the non-conductive polymer comprises aromatic monomer units having at least one aromatic hydroxyl group or a derivative thereof.

10. The membrane of claim 9, wherein the aromatic monomer units having at least one aromatic hydroxyl group or a derivative thereof comprises polyphenol.

11. The membrane of claim 9, wherein the aromatic monomer units having at least on aromatic hydroxyl group or a derivative thereof comprises a chlorinated hydroxydiphenylether.

12. The membrane of claim 1, wherein said electro-polymerized selective layer comprises a first and a second electro-polymerized selective layers, wherein said first electro-polymerized selective layer is disposed on the surface of said support and said second electro-polymerized selective layer is disposed on the surface of said first electro-polymerized selective layer.

13. The membrane of claim 1, wherein said membrane is a nanofiltration membrane.

14. The membrane of claim 1, wherein said membrane is a reverse osmosis membrane.

15. A composite membrane for water application(s) comprising;
   (i) an electronically conductive porous support having asymmetric porosity comprising a mixture of non-conductive organic polymer and a conductive component selected from the group consisting of conductive particles and conductive polymer; and
   (ii) an electro-polymerized selective layer.

16. A composite membrane for gas application(s) comprising;
   (i) an electronically conductive asymmetric porous support having asymmetric porosity comprising a mixture of non-conductive organic polymer and a conductive component selected from the group consisting of conductive particles and conductive polymer; and
   (ii) an electropolymerized selective layer.

17. A membrane system comprising at least one composite membrane comprising;
   (i) an electronically conductive asymmetric porous support having asymmetric porosity comprising a mixture of non-conductive organic polymer and a conductive component selected from the group consisting of conductive particles and conductive polymer; and
   (ii) an electro-polymerized selective layer.

18. The membrane system of claim 17, wherein said membrane is adapted for use in water application(s), gas application(s) or both.

19. The membrane system of claim 18, wherein said at least one composite membrane is configured as a capillary, hollow fiber, tubular membrane or any combination thereof.

20. The membrane of claim 1, wherein said conductive particles comprise activated carbon, charcoal, carbon black, carbon soot, nano-tubes, graphite, amorphous carbon or any combination thereof.

* * * * *